United States Patent
Yang et al.

(10) Patent No.: US 6,518,219 B1
(45) Date of Patent: Feb. 11, 2003

(54) CATALYST FOR HYDROREFINING FRACTION OILS, ITS CARRIER AND PREPARATION

(75) Inventors: Qinghe Yang, Beijing (CN); Bin Liu, Beijing (CN); Hong Nie, Beijing (CN); Xuefen Liu, Beijing (CN); Dadong Li, Beijing (CN); Yahua Shi, Beijing (CN); Fucheng Zhuang, Beijing (CN)

(73) Assignees: China Petrochemical Corporation, Beijing (CN); Research Institute of Petroleum Processing, Sinopec, Beijing (CN)

(*) Notice: Subject to any disclaimer, the term of this patent is extended or adjusted under 35 U.S.C. 154(b) by 0 days.

(21) Appl. No.: 09/687,564

(22) Filed: Oct. 13, 2000

(30) Foreign Application Priority Data

Oct. 14, 1999 (CN) .......................... 99121916 A (51) Int. Cl.$^7$ .......................... B01J 23/00; C01F 7/02; C04B 35/03
(52) U.S. Cl. .................. 502/314; 502/313; 502/315; 502/316; 423/625; 423/626; 423/628; 423/630; 423/631; 501/127
(58) Field of Search ................. 502/313–316; 423/625, 626, 628, 630, 631; 501/127

(56) References Cited

U.S. PATENT DOCUMENTS

| | | | |
|---|---|---|---|
| 2,980,632 A | | 4/1961 | Malley et al. .............. 252/465 |
| 3,779,903 A | | 12/1973 | Levinson ................ 208/254 H |
| 3,876,680 A | * | 4/1975 | Christman et al. .......... 252/465 |
| 4,145,316 A | * | 3/1979 | Robson ...................... 252/465 |
| 4,172,809 A | * | 10/1979 | Triki ...................... 252/455 R |
| 4,248,852 A | | 2/1981 | Wakabayashi et al. ....... 423/626 |
| 4,330,395 A | | 5/1982 | Pott et al. .................... 208/115 |
| 4,371,513 A | | 2/1983 | Sánchez et al. ............. 423/625 |
| 4,500,444 A | | 2/1985 | Beekman ................. 252/315.7 |
| 4,579,729 A | * | 4/1986 | Schoenthal et al. ......... 423/626 |
| 4,900,711 A | * | 2/1990 | Nebesh et al. .............. 502/228 |
| 5,545,602 A | * | 8/1996 | Nelson et al. .............. 502/314 |
| 5,565,091 A | * | 10/1996 | Iino et al. ............... 208/216 R |
| 5,800,797 A | * | 9/1998 | Matsumoto et al. ........ 423/625 |

FOREIGN PATENT DOCUMENTS

| | | |
|---|---|---|
| CN | 85 1 00161 A | 8/1986 |
| CN | 85 1 04438 B | 8/1986 |
| CN | 1105053 A | 7/1995 |
| CN | 1169336 A | 1/1998 |
| EP | 0147167 A2 | 7/1985 |
| GB | 2146633 A | 4/1985 |
| GB | 2146633 B | 5/1987 |

OTHER PUBLICATIONS

Scientific Publishing House (1990). *The Petrochemical Analytical Methods* (RIPPTesting Method) pp. 185–187 and pp. 360–361. (English translation.) Month not avail.

* cited by examiner

*Primary Examiner*—Mark L. Bell
*Assistant Examiner*—Patricia L. Hailey
(74) *Attorney, Agent, or Firm*—Morrison & Foerster LLP (57) ABSTRACT

A catalyst for hydrofining fraction oils, comprises an alumina carrier and at least one metal and/or thereof oxide of Group VIB and at least one metal and/or thereof oxide of Group VIII supported on said alumina carrier. The pore volume of said alumina carrier is not less than 0.35 ml/g, in which the pore volume of the pores having a diameter of 40–100 angstrom accounts for more than 80% of the total pore volume, the alumina carrier is prepared by a special process. The catalyst possesses relatively high hydrogenation activity.

26 Claims, 2 Drawing Sheets

CATALYST FOR HYDROREFINING FRACTION OILS, ITS CARRIER AND PREPARATION

The invention relates to a catalyst for hydrorefining fraction oils and its preparation process as well as a carrier of the catalyst and its preparation process. More particularly, this invention relates to a catalyst for hydrorefining fraction oils, which comprises metal(s) and/or metal oxide(s) of Group VIB and metal(s) and/or metal oxide(s) of Group VIII, and its preparation process as well a carrier of the catalyst and its preparation process.

In recent years, the quality of crude oil resources is showing a tendency to deteriorate steadily worldwide; the content of sulfur, nitrogen and aromatics in the oils is also increasing obviously. The conflict between the ever-stringent environment regulations and this critical reality becomes intensified day by day. It is well known that hydrogenation process is one of the most efficient means for improving quality of the oils, in which hydrotreating catalyst is the most significant key technology. Therefore, many leading companies have already devoted themselves to improving the existing hydrotreating catalysts and continuously developing hydrotreating catalysts having better properties. The current trend in developing hydrotreating catalyst is focused on further reducing the metal content in the catalyst, increasing its catalytic activity and modifying the properties of carrier to render it more suitable for hydrotreating the inferior-quality oils.

Hydrotreating catalysts generally comprise metals and/or metal oxides having hydrogenation function as components and a catalyst carrier, some of the catalysts may contain additives also.

The mostly used metal and/or metal oxide possessing hydrogenation function is selected from metals and met al oxides of Group VIB and metals and/or metal oxides of Group VIII of the Periodic Table of Elements. Said metal and/or metal oxide of Group VIII can be one or more selected from the group consisting of the metals and/or metal oxides of iron, cobalt, nickel, ruthenium, rhodium, palladium, osmium, iridium and platinum, of which nickel and cobalt are mostly selected. Said metal and/or metal oxide of Group VIB can be one or more selected from the group consisting of the metals and/or metal oxides of chromium, molybdenum and tungsten, of which molybdenum and tungsten are mostly selected.

The mostly used additive is one or more selected from the group consisting of the oxides of magnesium, oxides of phosphorus and fluorine.

The mostly used catalyst carriers are those made of silica, alumina and silica-alumina, of which alumina is the most extensively applied catalyst carrier.

In U.S. Pat. No. 3,779,903, a carrier having pore volume of 0.15–0.45 ml/g is prepared via drying and calcining an alumina sol, from which a catalyst comprising 10–18 wt % nickel oxide, 25–40 wt % tungsten oxide and 1–9 wt % fluorine is obtained after the steps of impregnating the carrier with a solution of tungsten and nickel, drying and calcining. However, the catalyst has a high metal content, especially a very high the nickel content, hence resulting in a very high cost of the catalyst.

In U.S. Pat. No. 4,330,395 a catalyst for hydrorefining fraction oils is prepared by taking tungsten compound and aluminum compound as row materials, through drying, calcining and impregnating the carrier with a solution of nickel compound, and thereafter, sulfurizing and fluorinating the catalyst with sulfur compound and fluorine compound, respectively. This catalyst also has the same drawback of overhigh metal content, besides, the preparation process of the catalyst is relatively complex.

In CN 85,104,438B, a hydrorefining catalyst comprising 1–5 wt % nickel oxide, 12–35 wt % tungsten oxide and 1–9 wt % fluorine is manufactured by taking high-purity boehmite as precursor of the catalyst carrier, which is prepared through hydrolysis reaction of alkoxyl aluminium or alkyl aluminium. Although the catalyst has lower metal content and is one of the most active hydrorefining catalysts for fraction oils in the prior art, the cost of the catalyst is still relatively high because the precursor of the catalyst carrier is made of the expensive boehmite.

CN 1,169,336A discloses a catalyst for hydrorefining fraction oils and its preparation process. The catalyst consists of 1–5 wt % nickel oxide, 12–35 wt % tungsten oxide, 1–9 wt % fluorine and alumina as the remainder. Said alumina was prepared by compounding one or more microporous alumina(s) with one or more macroporous alumina(s) in the weight ratio of 75:25–50:50. In said microporous alumina, the volume of pores having a diameter of less than 80 angstrom accounts for more than 95% of the total pore volume; in said macroporous alumina, the volume of pores having a diameter of 60–600 angstrom accounts for more than 70% of the total pore volume. The preparation process of the catalyst comprises, forming and calcining the alumina precursor; then impregnating the material obtained in the previous steps sequentially with a fluorine-containing aqueous solution and a nickel-tungsten containing precursors aqueous solution; drying and calcining after each impregnation step. Said alumina precursor is a mixture of the precursors of said microporous alumina and said macroporous alumina. In this mixture, the ratio of said microporous alumina precursor to said macroporous alumina precursor is so set that the weight ratio of said microporous alumina to said macroporous alumina in the final catalyst product falls in the range of 75:25–50:50. In the alumina carrier of the catalyst as prepared by this process, the volume of pores having a diameter ranging from 40–100 angstrom accounts for higher than 75% of the total pore volume and the catalyst is one of the most active hydrotreating catalysts for fraction oils in the prior art, but the preparation process of the catalyst is rather complex due to the use of two kinds of alumina.

In addition, CN 1,105,053A discloses a catalyst suitable for hydrorefining heavy fraction oils. Said catalyst comprises 1–5 wt % nickel oxide, 15–38 wt % tungsten oxide and 1–9 wt % fluorine as well as a carrier of modified alumina that is obtained by high-temperature treatment in the present of air and steam. The pore distribution of the modified alumina is concentrated in the range of 60–200 angstrom. However, obviously the process has shortcomings in its complicated preparation technology and high energy-consumption as a result of the adoption of high-temperature treatment with air and steam.

As a carrier of hydrogenation catalyst, the differences in pore structure, acidity and preparation method of the alumina manifest a great influence on the catalytic performance. Therefore, many preparation methods have been developed in the prior art in order to meet the requirements of different catalysts for the properties of the carriers.

Take $\gamma$-$Al_2O_3$ for example, pseudo-boehmite via calcination forms $\gamma$-$Al_2O_3$ which is a mostly used carrier or substrate of catalysts. The properties of $\gamma$-$Al_2O_3$ play a very important role in the comprehensive performance of the catalyst when it is used as the carrier or substrate of the catalyst. In general, it is desired that the pseudo-boehmite should have a relatively high crystallinity. The content of bayerite as impurity shall be at very low level, preferable nonexistent. In addition, the content of ion impurities shall be at low level also, the acid radical ions in the alumina product, such as the sulfuric acid radical ions shall not be higher than 2 wt % and alkali metal oxides not higher than 0.15 wt %. The $\gamma$-$Al_2O_3$ carrier formed by calcination of pseudo-boehmite shall possess relatively larger specific surface area, higher strength and proper pore volume as well as narrow pore distribution.

In the prior art, a conventional process for preparing pseudo-boehmite and $\gamma$-$Al_2O_3$ is known as sodium meta-aluminate (or sodium aluminate)-aluminium sulfate (aluminium nitrate, aluminium muriate, nitric acid, or sulfuric acid) process.

U.S. Pat. No. 2,980,632 discloses a process for preparing an alumina-based catalyst, comprising precipitating the hydrated alumina out of the aqueous solution of aluminium compound at pH value of 7–9.5, and aging the slurry for at least 0.25–0.5 hour at higher pH value (10–11). Said hydrated alumina precipitate is obtained by the neutralization reaction between a sodium aluminate solution and an aluminium sulfate solution. Said higher pH value is adjusted by reducing the dosage of said aluminium sulfate solution. In this process for preparing pseudo-boehmite, the amounts of aluminium sulfate is relatively increased because the adjustment of pH value is realized by reducing the dosage of aluminium sulfate. When the pH value rising over 10, self-hydrolysis reaction of sodium aluminate is liable to occur, and as a result, bayerite is formed. Thus on the one hand, said bayerite will cover the surface of the original precipitate, and block up the pores and thereby reducing the pore volume of resultant alumina, and on the other hand, excessive $\eta$-$Al_2O_3$ will be formed in the resultant alumina. Therefore, it should be well appreciated that the alumina prepared by this process is not suitable for being used as the carrier of the catalyst for hydrorefining fraction oils.

U.S. Pat. No. 4,371,513 discloses a process suitable for preparing spheroidal alumina particles, comprising precipitating alumina under the conditions of specially controlled reactant concentration, reaction temperature, time and pH value, and filtrating at higher pH value. Specifically, this process comprises adding a sufficient portion of the aluminium sulfate solution having an alumina concentration of 5–9 wt % and a temperature of 130–160° F. into the water having temperature of 140–170° F.; and adjusting pH value of this mixture to 2–5; adding a sodium meta-aluminate solution having an alumina concentration of 18–22 wt % and a temperature of 130–160° F. and another portion of said aluminium sulfate solution simultaneously into said mixture so as to precipitate the alumina and form an alumina slurry which is maintained at a pH value of 7–8 and temperature of 140–180° F., wherein the feeding velocity of the solutions is controlled in such a way as to effect the formation of boehmite and boehmite as intermediates; adjusting the pH value of the slurry to 9.5–10.5; filtrating the slurry and washing the filter cake to obtain the substantially pure aluminium hydroxide. The pore distribution of the alumina so prepared falls in a wider range (with pore diameters ranging from 100–1000 angstrom). It would be well appreciated that alumina without narrow pore distribution is not suitable for use as carrier of the catalyst for hydrorefining fraction oils.

U.S. Pat. No. 4,248,852 discloses a process for preparing all alumina for use as catalyst carrier. The process comprises cultivating a seed aluminium hydroxide gel having a pH value of 5–6 at a temperature of at least 50° C.; sequentially adding (a) an aluminium compound and adjusting the pH value of said sol to reach pH value of lower than 5 or higher than 11 aimed at dissolving the crystals of aluminium hydroxide; adding (b) a neutralizer to adjust the pH value falling back to 6–10 for purpose of facilitating growth of the hydrated alumina; repeating the addition of said aluminium compound and said neutralizer for at least two times in order to make the crystals of said hydrated alumina grow continuously; and drying and calcining the crystals of said hydrated alumina. The alumina prepared by this process possesses relatively larger specific surface area and a pore volume controlled in a certain range (0.5–2 ml/g). The pore distribution of the alumina is narrowed in the range of 0–200 or 100–500 angstrom. However, this process is not preferred because the process adjusts the pH value in large amplitude for at least three times, and as a result, makes the preparation procedure too complex.

GB 2,146,633A discloses a process for preparing an alumina for use as catalyst carrier, comprising (1) adding an aluminium sulfate solution and a sodium aluminate solution simultaneously at a pH value of 6.0–8.5 and temperature of 50–56° C. into a deionized water to prepare an aqueous slurry containing amorphous hydrated alumina; (2) adding a sodium aluminate solution into said slurry formed in the first step in an amount sufficient to neutralize said slurry so as to obtain the second aqueous slurry containing at least 7 wt % alumina, wherein the total amount of sodium aluminate used in step (1) and step (2) is equal to 0.95–1.05 of the equivalent amount of aluminium sulfate used in step (I); (3) filtrating the amorphous aluminium hydroxide out of said second aqueous slurry and washing the filter cake sequentially with aqueous ammonia solution, nitric acid solution and aqueous ammonia solution to ensure the final pH value of the filter cake reaching 7.5–10.5; (4) dewatering the filter cake in a filter press to increase the alumina content to 28–35 wt %; kneading the dewatered filter press cake for at least 10 seconds to obtain a doughy material; (5) extruding the doughy material into strips; drying and calcining the extrudate. However, the catalyst using the carrier made of the alumina prepared by this process shows very low activity. In addition, three times of washing the filter cake with aqueous ammonia solution and nitric acid solution render this process rather complicated to operate, and too much waste water to be discharged into the environment.

Petroleum Refining, on pages 11–42, and 50–57, 1978 edition, discloses an aluminium sulfate-sodium meta-aluminate process for preparing $\gamma$-$Al_2O_3$, comprising adding an aluminium sulfate and sodium meta-aluminate with pure water in a certain ratio in co-current flow into a neutralization tank with a stirrer to carry out precipitation reaction at pH value of 7.5–9.0, temperature of 40–70° C. and residence time of 15 minutes; collecting the slurry formed in the precipitation process in an aging tank for 30 minutes; maintaining the temperature at a certain degree; aging for 30 minutes and filtrating; then adding pure water in an amount of 30 times (by weight) the dosage of alumina stock into the filter cake for first washing; adding a given amount of sodium carbonate in the initial phase of the washing to adjust pH value of the slurry to 10.0; washing with stirring for 20 minutes and filtrating; repeating washing for three times without adding sodium carbonate; drying at 110–120° C. and calcining at 550° C. for 4 hours, and finally obtaining the $\gamma$-$Al_2O_3$. The key point in this process is to add sodium carbonate to adjust pH value to 10 in the first washing step. The addition of sodium carbonate fulfills two functions, i.e., increasing pore volume and reducing content of sulfuric acid radical in alumina. However, in view of industrial application, adding sodium carbonate in washing process has following disadvantages: (1) Due to the limit in performance of the industrial filtrating equipment, penetration and leakage phenomena in the filter always occur in company with the filtration process. For this reason, the content of alumina in the cake collected in the first washing step is usually lower than the dosage of alumina fed in the precipitation process. Besides, in the commercial production many sets of filtrating equipment are used simultaneously and there exists a difference in the filtrating performance, so the amounts of alumina collected in different lots might be different. As the required dosage of sodium carbonate depends on the amount of aluminium material fed in the precipitation process, thus making it difficult to determine the dosage of sodium carbonate needed in the process. Therefore, estimation method is usually adopted as an option in the commercial application, though this method apparently showed a great deviation from the real value sometimes. Furthermore, the dosage of sodium carbonate has an important effect on the pore volume and pore distribution of the alumina, consequently, the alumina obtained from the above-mentioned process of adding sodium carbonate often lacking reproducibility in its performance. In turn, the hydrogenation catalysts made from this carrier also suffered the unstability in their catalytic properties. (2) In view of continuous industrial production, the belt filter is usually adopted as a best option in the industrial application. Since the washing procedure can be completed in a single run with this equipment, the yield of alumina and production efficiency are raised while the production cost is reduced. However, on the other hand, the addition of sodium carbonate should be effected in the course of washing and a filtrating step is regarded during the course from aging to first washing, this sequence of the operation has greatly limited the utilization of the belt filter in the industry.

Another conventional process for preparing pseudo-boehmite and $\gamma Al_2O_3$ is known as sodium meta-aluminate-carbon dioxide process. Since this process can be operated in combination with the practical conditions of the aluminium production plant, by utilizing the sodium meta-aluminate solution or sodium aluminate solution produced from bauxite and waste carbon dioxide gas as feedstocks to prepare alumina, it has been applied extensively in the industry for cost-effectiveness.

In the prior art, the precipitation reaction (or known as neutralization reaction) between sodium meta-aluminate (or sodium aluminate) and carbon dioxide can be carried out in a batch or continuous way. In the precipitation reaction in batch process, carbon dioxide gas is fed into a great volume of sodium meta-aluminate or sodium aluminate solution, and the pH value (end-point pH) of the precipitation reaction is controlled at 9.5, preferably higher than 10. In the precipitation reaction in continuous process, sodium meta-aluminate or sodium aluminate solution and carbon dioxide contact each other at a certain flow rate, respectively, and pH (pH in the course) value of the precipitation reaction is also controlled at 9.5, preferably higher than 10. From the precipitation reaction at such high pH value, pseudo-boehmite (the precursor of $\gamma$-$Al_2O_3$) having high crystallinity can be obtained. But, as its crystalline particles are in solid spheroidal shape and packed closely, smaller pores are formed in the alumina after calcining, and the pore volume of pores having a diameter in the range of 20–60 angstrom accounts for 60% of the total pore volume, thus detrimentally affecting its application in the preparation of catalyst for hydrorefining fraction oils.

For instance, U.S. Pat. No. 3,268,295 discloses a process for preparing a hydrated alumina having a content of crystalline water of 1.4–1.6 mol/mol alumina and an average crystal size of 20–40 angstrom. In the X-ray diffraction pattern of said alumina, the area within the peak at 2θ=21.8° accounts for 40–90% area of the peak corresponding to boehmite. This process comprises (a) reacting sodium aluminate having sodium content of less than 200 g $Na_2CO_3$/l with approximately stoichiometric carbon dioxide to prepare an amorphous aluminium hydroxide, which substantially does not contain crystalline hydrated alumina, at temperature of 25–60° C., reaction time of 2–20 minutes and pH value of 10–11, thereby said aluminium hydroxide being precipitated substantially through neutralization reaction instead of hydrolysis reaction; (b) separating said precipitate from mother liquid, washing said precipitate and beating up said precipitate and water into slurry again so as to disperse said precipitate, and-maintaining it in an amorphous state; (c) aging the precipitate in the slurry for 5–90 minutes at temperature lower than 100° C. and pH value of 8–9 to transform the amorphous aluminium hydroxide into crystalline hydrated alumina.

EP 0,147,167A2 discloses a process for producing alumina gel by neutralizing aluminate in continuous way, comprising (a) feeding a sodium aluminate solution having a given degree of total causticity and a given alumina to causticity ratio into a reactor; (b) keeping said solution inside the reactor at a given temperature; (c) contacting a neutralizer with said solution and reducing the pH value lower to the preset value, wherein said neutralizer is selected from gases which are soluble in said sodium aluminate solution and from liquids which are insoluble in said sodium aluminate solution; (d) continuously removing the formed alumina gel from the reactor, wherein the removing speed is selected based on the causticity, ratio of alumina to causticity, reaction temperature, pH value and residence time so as to have the alumina gel transform into a particular morphology. It is pointed out on page 7 in this application that the pH value in the neutralization reaction can be in the range from 8.5 to 12 depending on different products as desired. For instance, dawsonite can be produced at pH value of 8.5–10.2 while bayerite can be obtained at pH value of 12, and in case of a pH value in the range of 10.4–10.7, pseudo-boehmite can be mainly obtained.

CN 85,100,161A discloses a process for preparing pseudo-boehmite by utilizing the industrial grade sodium aluminate solution formed in the production of alumina, through the precipitation in carbonation reaction. This process comprises adding distilled water or deionized water into the industrial sodium aluminate solution having an alumina concentration of 70–130 g/l and a temperature of 70–100° C. to dilute and cool said industrial sodium aluminate solution until the alumina concentration reaches 20–60 g/l and temperature reaches 15–45° C.; removing the $Al(OH)_3$ residue by filtrating said industrial sodium aluminate solution after diluting and cooling; introducing carbon dioxide gas in a concentration of 30–40% to carry out quick precipitation in carbonation reaction in either batch or continuous way, wherein when precipitation in carbonation reaction is carried out in batch way, the carbon dioxide gas is introduced at a flow rate of 2–8 g $CO_2$/g alumina-hr for 10–30 minutes; and when precipitation in carbonation reaction is carried out in continuous way, the carbon dioxide gas is introduced at a flow rate of 1–6 g $CO_2$/g alumina-hr for a carbonation time of 30–90 minutes; heating the slurry after precipitation to 70–100° C., holding the temperature constant and aging for 1–6 hours; or directly separating solid from liquid firstly then aging in the washing process; washing the separated solid with distilled water or deionized water at 70–100° C.

for 1–4 times, wherein a portion of the washing liquid is fed back to dilute said industrial sodium aluminate solution; recycling the separated mother liquid and the remaining washing liquid to the aluminium production flow; finally, drying and grinding the washed wet stock by a conventional method to obtain the pseudo-boehmite powder. According to the precipitation conditions as stated in the application, the end-point pH value or the process pH value in the course of precipitation is also controlled in the range from 10.5 to 12.0.

In the prior art, the reason for controlling the end-point pH or the process pH in the range of 10–12 in the case of producing pseudo-boehmite by sodium meta-aluminate (or sodium aluminate)-carbon dioxide process is that when the end-point pH value or the process pH in the course of reaction is less than 10, particularly less than 9.5, in the precipitation process, aluminium hydroxide and sodium bicarbonate formed in the precipitation process shall react with each other to produce dawsonite ($NaAl(OH)_2CO_3$). Taking the production of pseudo-boehmite by sodium meta-aluminate-carbon dioxide process as an example, the following reactions exist in the precipitation process:

Since dawsonite is not soluble in water, it cannot be removed in the washing step, as a result the sodium content in the product is too high, thereby seriously affecting the product quality.

U.S. Pat. No. 4,500,444 discloses a process for preparing a basic aluminium carbonate, comprising reacting sodium meta-aluminate with carbon dioxide in aqueous solution at pH value of 6.8±0.2 and temperature of 10–50° C. to form basic aluminium carbonate colloid, and separating said colloid from reaction medium by filtration. Then pseudo-boehmite can be formed by hydrolyzing said colloid with acid. The contents of sulfuric acid radical and sodium ions in the pseudo-boehmite made by this process are reduced obviously. But the crystallinity, pore volume and pore diameter of the pseudo-boehmite are also very low, therefore the alumina prepared therefrom is not suitable for use as carrier for catalyst for hydrorefining fraction oils. At same time, the washing step becomes very difficult due to peptization of the acid. In addition, this process comprises decomposition of basic aluminum carbonate, so there is a large consumption of expensive organic acid and consequently the productive cost goes up, and more seriously, corrosion caused by the process is detrimental to the productive facilities.

An object of the present invention is to provide a novel catalyst for hydrorefining fraction oil, which possesses higher catalytic activity and the preparation process thereof. Another object of the present invention is to provide an alumina carrier for supporting said catalyst and the preparation process thereof.

Said catalyst according to the present invention comprises an alumina carrier and at least one metal and/or thereof oxide of Group VIB and at least one metal and/or thereof oxide of Group VIII supported on said alumina carrier; the pore volume of said alumina carrier is not less than 0.35 ml/g, in which the pore volume of the pores having a diameter of 40–100 angstrom accounts for more than 80% of the total pore volume, said alumina carrier is prepared by one or two of the following processes, wherein:

Process 1 comprises contacting a solution of sodium meta-aluminate or sodium aluminate with one or more of the solutions of aluminium sulfate, aluminium nitrate, aluminium chloride, nitric acid and sulfuric acid to carry out the primary precipitation reaction that may run in in a continuous way; aging the obtained aluminium hydroxide; separating solid from liquid, and washing, drying and calcining the obtained solid resultant, wherein the pH value of said primary precipitation reaction is 6–9.5, the temperature of said primary precipitation is 10–100° C., the slurry formed in said precipitation reaction (primary precipitation) is collected in a secondary precipitation tank for a collecting time of not less than 10 minutes, and after finishing the collection, the slurry is switched to another secondary precipitation tank to continue the collection; to the secondary precipitation tank where the collection is finished, adding one or more of alkali carbonate, a mixed solution of alkali bicarbonate and aqueous ammonia, ammonium carbonate and ammonium bicarbonate in order to carry out the secondary precipitation reaction, wherein the pH value of the secondary precipitation reaction is controlled at 9.0–10.5.

Wherein concentration of said aluminium meta-aluminate or sodium aluminate solution as well as the concentration of aluminum sulfate, aluminium nitrate, aluminium chloride, nitric acid and sulfuric acid solution can be any, or possibly existing concentration, provided that the pH value of 6–9.5 of the primary precipitation reaction is guaranteed. In order to prepare pseudo-boehmite efficiently, the concentration of sodium metal-aluminate or sodium aluminate solution is preferably 30–300 g alumina/l, the concentration of aluminum sulfate, aluminium nitrate and aluminium chloride is preferably 10–120 g alumina/l, the concentration of nitric acid and sulfuric acid is preferably 5–15 wt %.

The addition of the substances such as sodium carbonate, ammonium carbonate and ammonium bicarbonate can be carried out in solid form or aqueous solution form, preferably aqueous solution form.

The pH value of said primary precipitation reaction is preferably 6–9. The temperature of said primary precipitation reaction is preferably 30–90° C. The collecting time is preferably 10–90 minutes. The pH value of secondary precipitation is preferably 9.5–10.5.

The method for separating solid from liquid, can adopt conventional methods, such as filtration method or centrifugal separation method.

Said aging can be carried out under conventional conditions; normally the temperature of said aging is in the range of 5–100° C., preferably 30–100° C., more preferably 30–90° C.; the time of said aging is longer than 0.5 hour, preferably 1–8 hours.

Said washing can be carried out by conventional method; the object of said washing is to remove the impurity ions from the resultant alumina, such as sulfate ion, sodium ion, etc.; said washing shall ensure the content of alkali metal oxides in the resultant alumina to be less than 0.15 wt %, and the content of sulfate ion less than 2 wt %.

When preparing alumina carrier, there may be and preferably there is a shaping step prior to drying. The shaping method can adopt the various existing methods, such as tabletting method, spheroidal forming method and extrusion forming method etc.; preferably the extrusion forming method. Various existing peptizers and/or extrusion aids can be added in the shaping process, said peptizers can be selected from the group consisting of various inorganic acids or organic acids, such as chlorhydric acid, nitric acid, citric acid and acetic acid. Said extrusion aids can be selected from starch substances, cellulose substances and the like.

Said drying condition is conventional drying condition, the drying temperature can be in the range from ambient temperature to the temperature lower than the crystal transformation temperature of pseudo-boehmite, preferably 100–200° C.

Said calcining condition is conventional calcining condition, the calcining temperature is normally 500–900° C., preferably 550–850° C.; the calcining time is normally 2–8 hours, preferably 3–6 hours.

Process 2 comprises contacting a solution of sodium meta-aluminate or sodium aluminate with a gas containing carbon dioxide to carry out precipitation in batch or continuous way; aging the obtained aluminium hydroxide; separating solid from liquid; washing, drying and calcining the obtained solid resultant, wherein the end-point pH value or process pH value in the course of said precipitation is controlled in the range of 6–9.5, the time of said precipitation reaction or the residence time is less than 40 minutes, the temperature of said precipitation reaction is 10–100° C., and as soon as said precipitation reaction is ended a basic substance is added promptly so as to make the pH value of the slurry rise to higher than 9.5 or quickly carry out the separation of the solid from liquid and washing.

The concentration of said aluminium meta-aluminate or sodium aluminate solution can be any, or possibly existing concentration. In order to prepare pseudo-boehmite efficiently, the concentration of said sodium meta-aluminate or sodium aluminate solution is preferably 5–200 g alumina /l, more preferably 5–120 g alumina/l.

Said gas containing carbon dioxide can be pure carbon dioxide gas or a mixed gas consisting of carbon dioxide and inert gas which does not affect the reaction, such as a mixture of carbon dioxide and one or more matters selected from the group consisting of air, nitrogen, helium and argon, etc. The carbon dioxide content in said gas containing carbon dioxide can vary in a wide range, and normally the carbon dioxide content is not less than 5 v %, preferably not less than 20 v %.

Said precipitation can be carried out in a batch way. When adopting this way, the procedures comprise adding said sodium meta-aluminate or sodium aluminate solution in a precipitation tank firstly; introducing said gas containing carbon, dioxide through the bottom of the tank; controlling the reaction temperature at 10–100° C., preferably 10–80° C.; and controlling the end-point pH value at 6–9.5, preferably 6.5–9.3; adjusting the concentration and dosage of said sodium meta-aluminate or sodium aluminate solution as well as the concentration and flow rate of said gas containing carbon dioxide to make sure the time of said precipitation reaction not to exceed 40 minutes, preferably not to exceed 30 minutes; adding basic substance to make the pH value of the slurry rapidly rise to higher than 9.5, preferably 9.5–11.5, as soon as said precipitation reaction is ended; or quickly carrying out the separation of the solid from liquid, and washing; thereafter aging, filtrating, washing and drying under conventional conditions, to obtain pseudo-boehmite, which is then calcined and formed to obtain the alumina carrier.

Said precipitation reaction can be carried out in a continuous way. When adopting this way of precipitation, the procedures comprise adding deionized water into a precipitation tank in advance; introducing said gas containing carbon dioxide through the bottom of the tank and simultaneously feeding the sodium meta-aluminate or sodium aluminate solution through the top of the tank to make said sodium meta-aluminate or sodium aluminate solution to contact said gas containing carbon dioxide in countercurrent flow; controlling the temperature of said precipitation reaction in the range of 10–100° C., preferably 10–80° C.; controlling the concentration and the flow rate of said sodium meta-aluminate or sodium aluminate solution as well as the concentration and the flow rate of said gas containing carbon dioxide to make the process pH in the course of the precipitation reaction reach 6–9.5, preferably 6.5–9.3, and make the residence time not to exceed 40 minutes, preferably not to exceed 30 minutes; collecting the slurry formed in said precipitation reaction in batch or continuous way in an aging tank, and adding basic substance in batch or continuous way to make the pH value of said slurry rise to higher than 9.5, preferably in the range of 9.5–11.5, switching said slurry formed in said precipitation reaction to another aging tank after collecting for a given time; aging said slurry having pH of higher than 9.5 in the first aging tank; filtrating, washing and drying to get pseudo-boehmite and calcining to obtain alumina carrier.

Said basic substance is one or more matters selected from the group consisting of inorganic bases, organic bases and their aqueous solutions, wherein said inorganic base is one or more matters selected from the group consisting of hydroxides, meta-aluminates, carbonates and bicarbonates of alkali metal, ammonium carbonate, aqueous ammonia and their aqueous solutions. Said organic base is one or more matters selected from the group consisting of water soluble amines, carbamide, pyridine and their aqueous solutions, preferably one or more matters selected from the group consisting of water soluble aliphatic amines, hydroxyammonium hydroxide, urea, pyridine and their aqueous solutions, more preferably one or more matters selected from the group consisting of methylamine, ethylamine, propylamine, propane diamine, isomers of butyl amine, isomers of pentyl amine, tetraethylammonium hydroxide, urea, pyridine and their aqueous solutions.

Said method for separating solid from liquid can adopt either filtration method or centrifugal separation method. The rapid washing after separating solid from liquid is aimed at removing the resultant sodium carbonate, which can form dawsonite. In general, said washing is carried out with deionized water in a volume of not less than 10 times of that of the weight of solid product for at least once.

Said aging can be carried out under conventional aging conditions; the temperature of said aging is normally in the range of 5–100° C., preferably 30–100° C., more preferably 50–100° C.; the time of said aging is longer than 0.5 hour, preferably 1–8 hours. When adjusting the pH value by adding basic substance, mother liquid or deionized water can be used as aging medium; in the case of separating solid from liquid in a quick way, the deionized water is generally selected as the aging medium.

Said washing after aging can be carried out by conventional method; the object of said washing is to remove the impurity ions inside and to ensure the content of alkali metal oxides inside to be less than 0.15 wt %.

Said drying conditions are conventional drying conditions, the drying temperature can be in the range from ambient temperature to temperature lower than the crystal transformation temperature of pseudo-boehmite, preferably 100–200° C.

When preparing alumina carrier, similarly, there may be and preferably there is a shaping step prior to drying.

Said calcining conditions are conventional calcining conditions, for example, the calcining temperature is normally in the range of 500–900° C., preferably 550–850° C.; and the calcining time is normally in the range of 2–8 hours, preferably 3–6 hours.

According to the catalyst provided by the present invention, said metal and/or thereof oxide of Group VIB is one or more selected from the group consisting of chromium, molybdenum, tungsten metals and their oxides, preferably one or more selected from the group consisting of molybdenum, tungsten metals and the oxides thereof, more preferably one or more selected from tungsten metal and the oxides thereof. The content of said metal of Group VIB in the catalyst is 12–35 wt %, calculated in oxide.

According to the catalyst provided by the present invention, said metal and/or thereof oxide of Group VIII is one or more selected from the group consisting of iron, cobalt, nickel, ruthenium, rhodium, palladium, osmium, iridium and platinum metals and their oxides, preferably one or more selected from the group consisting of cobalt, nickel and their oxides, more preferably nickel and the oxides thereof. The content of said metal of Group VIII in the catalyst is 1–5 wt %, calculated in oxide and based on the total weight of the catalyst.

The catalyst provided by the present invention may and preferably, contain 1–9 wt % fluorine based on the total weight of the catalyst.

The process for preparing the catalyst provided by the present invention comprises impregnating the catalyst carrier with aqueous solution containing metals of Group VIB and Group VIII, thereafter drying and calcining, wherein said catalyst carrier is the alumina carrier prepared by process 1 or process 2.

Said aqueous solution containing metal of Group VIB and Group VIII is aqueous solution containing metal compounds of Group VIB and Group VIII, preferably the aqueous solution contains molybdenum and/or tungsten and nickel and/or cobalt compound, such as a mixed aqueous solutions containing one or more selected from the group consisting of ammonium metawolframate, ammonium wolframate, ethyl-anmmonium metawolframate and ammonium molybdate, and containing one or more selected from the group consisting of nickel, metawolframate, nickel nitrate, nickel acetate cobalt nitrate, cobalt acetate; more preferably the aqueous solution contains tungsten and nickel compound, such as a mixed aqueous solutions containing one or more selected from the group consisting of ammonium metawolframate, ammonium wolframate and ethylmetawolframate, and containing one or more selected from the group consisting of nickel metawolframate, nickel nitrate and nickel acetate.

Wherein, before impregnating the catalyst carrier with said aqueous solution containing said metals of Group VIB and VIII, there may be and preferably conclude steps of impregnating the catalyst carrier with aqueous solution containing fluorine, drying and calcining. Said aqueous solution containing fluorine is aqueous solution containing inorganic compound of fluorine, for example, the aqueous solution of ammonium fluoride and/or hydrogen fluoride.

The drying after impregnating the catalyst carrier with the aqueous solution containing said metals of Group VIB and Group VIII or after impregnating the catalyst carrier with the aqueous solution containing fluorine is carried out under respectively conventional drying condition; the drying temperature can be in the range from ambient temperature to 300° C., preferably 100–200° C.

The calcination temperature after impregnating the catalyst carrier with the aqueous solution containing said metals of Group VIB and Group VIII or after impregnating the catalyst carrier with the aqueous solution containing fluorine is in the range from 400–600° C. for the calcination time is 1–8 hours, preferably 2–5 hours.

When preparing alumina carrier by the process 1 according to the present invention, the addition of alkali carbonate, the mixed solution of alkali bicarbonate and aqueous ammonia, ammonium bicarbonate and ammonium carbonate is carried out before aging and filtrating. The amount of sodium carbonate, mixed solution of sodium bicarbonate and aqueous ammonia, ammonium bicarbonate and ammonium carbonate can be accurately added based an the dosage of alumina feedstock, therefore, the shortcoming existing in the method of adding sodium carbonate during washing process in the prior art has been overcome. The pseudo-boehmite, as the precursor of alumina prepared by the process 1 according to the present invention, is inform of fibre, the alumina carrier made from the pseudo-boehmite not only has a pore volume of 0.45–0.75 ml/g, in which the pore volume of pores having a diameter of 40–100 angstrom accounts for more than 80% of the total pore volume, but also possesses good reproducibility. The alumina carrier so prepared shows eminent consistency in its property and reliable stability, hence it is suitable for use as the carrier of the catalyst for hydrorefining fraction oils.

The inventor of the present invention has discovered that during the process of said precipitation reaction between said sodium meta-aluminate or sodium aluminate and carbon dioxide, though the reaction of forming dawsonite may occur in company with the reaction of sodium carbonate and aluminium hydroxide when the end-point pH or process pH in the course of the reaction is lower than 9.5, the formation of dawsonite shall need an enough time to take place, generally speaking, 40 minutes or longer. It seems to imply such a possibility that as long as the pH value of precipitation is lower than 9.5, the pseudo-boehmite which substantially contains no dawsonite still can be obtained if only it is ensured that the time of having pH value at lower than 9.5 does not last long than 40 minutes. However, it is well known that the formed aluminium hydroxide usually need to be aged for an aging time of generally longer than 0.5 hour, besides the time of gel formation, in other words, the time of having the pH lower than 9.5 will be surely longer than 40 minutes. Against the drawback mentioned above, the inventor has ingeniously invented a process as described in Process 2 of the present invention. Process 2 has overcome the drawback originated from the relatively small pore volume and relative small pore diameter in the alumina carrier made from the pseudo-boehmite having crystals in form of solid spheroidal and packed closely prepared according to the prior art—sodium meta-aluminate or sodium aluminate carbon-dioxide process. The pseudo-boehmite prepared by Process 2 is in form of fibre, and the alumina made from the pseudo-boehmite after calcining has a pore volume of 0.45–0.75 ml/g, in which a pore volume of the pores having a diameter in the range of 40–100 angstrom accounts for more than 80% of the total pore volume. The alumina having this property is particularly suitable for use as the carrier of the catalyst for hydrorefining fraction oil.

Because the alumina having special property prepared by the special process mentioned above is adopted, the catalyst according to the present invention possesses the catalytic activity higher than the prior art. For example, the desulfurization-hydrogenation activity, denitrogeneration-hydrogenation activity and aromatic saturation-hydrogenation activity of the catalyst are generally higher than the catalyst disclosed in CN 85104438B. In addition, the catalyst according to the present invention still exhibits relatively high catalytic activity when it is employed in hydrorefining the inferior fraction oils having high sulfur content. For another example, when the catalyst according to the present invention is employed under lower bulk density (packing density) (0.78–0.88 g/ml), its properties of hydrodesulfurization, hydro-denitrogeneration and aromatic saturation are still higher than the corresponding activities of the catalyst (having bulk density of >1.0 g/ml) disclosed in CN 85104438B, that is to say, the catalyst according to the present invention still possesses higher hydrogenation activity under higher space velocity.

In addition, the catalyst according to the present invention embodies the advantage of low metal content of the catalyst disclosed in CN 85104438B. Furthermore, the alumina carrier prepared by Process 1 and Process 2 has very low cost, which only accounts for 15–50% of the cost of the carrier of CN 85104438B. Therefore, the cost of the catalyst according to the present invention is correspondingly reduced by a big margin. The catalyst provided by the present invention is a catalyst having high activity and low cost, which possesses significant value in the commercial application.

The alumina carrier according to the present invention is not only particularly suitable for use as the carrier of the catalyst for hydrorefining fraction oils but also suitable for use as the carrier or substrate of the catalyst for hydrocracking fraction oils.

The catalyst provided by the present invention is particularly suitable for hydrorefining the petroleum fraction oils having a distillation range of 80–550° C. The catalyst provided by the present invention in conjunction with the hydrocracking catalyst can be used for improving the quality of heavy fraction oils by hydrogenation, particularly suitable for improving the quality of heavy fraction oils by hydrogenation under medium-pressure.

The conventional hydrorefining process conditions can be utilized when the catalyst according to the present invention is used for hydrorefining fraction oils, such as reaction temperature of 200–500° C., preferably 300–400° C., reaction pressure of 2–24 MPa, preferably 3–15 MPa; hourly liquid space velocity of 0.1–30 hr$^{-1}$, preferably 0.2–10 hr$^{-1}$, and volume ratio of hydrogen to oil of 50–5000, preferably 200–1000.

The following examples serve to further illustrate the present invention without limiting the present invention in any form.

EXAMPLE 1

The present Example illustrates an alumina carrier provided by the present invention and the preparation thereof.

Figure 1:
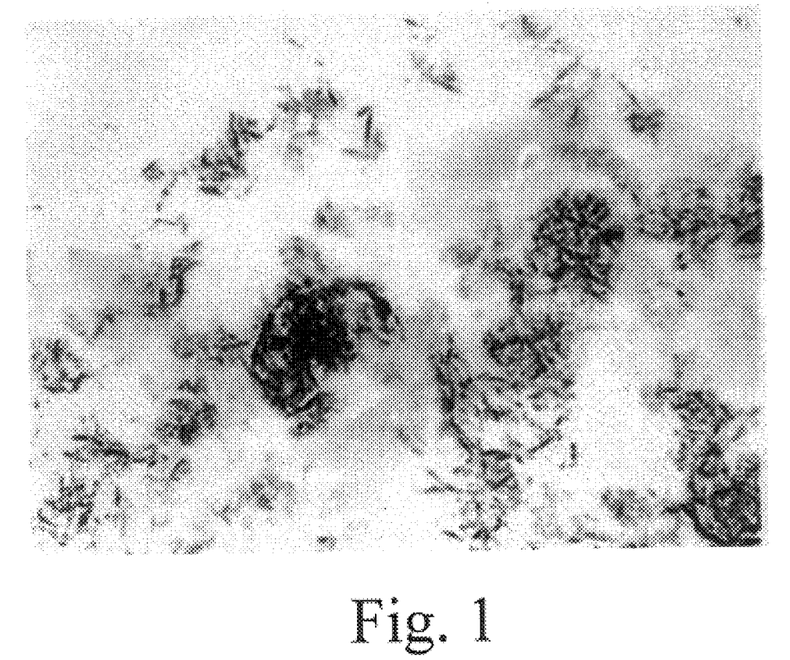
FIG. 1 is a transmission electron microscopic image of the pseudo-boehmite as the precursor of the alumina carrier provided by the present invention.

The NaAlO$_2$ solution in concentration of 250 g alumina/l and Al$_2$(SO$_4$)$_3$ solution in concentration of 100 g alumina/l were added in cocurrent into a 2 litter primary precipitation tank in which 1.5 liter water was added in advance. The flow rate of the NaALO$_2$ was 1.1 liter per hour. The flow rate of Al$_2$(SO$_4$)$_3$ solution was adjusted so as to make the pH value of precipitation to be 8.0. The temperature of precipitation process was 50° C. The slurry so formed was collected in a secondary precipitation tank (secondary tank) for a collecting time of 20 minutes, thereafter the slurry was switched to another secondary tank to be collected. Sodium carbonate was added into the secondary tank where the collection ws finished to adjust the pH value to 10.0. After aging for 50 minutes, the resultant was filtrated and washed with 30-fold deionized water for at least 4 times, then the filter cake was dried at temperature of 120° C. to produce pseudo-boehmite. FIG. 1 shows a transmission electron microscope image of the pseudo-boehmite taken at 50,000 magnifications. It could be seen from the transmission electron microscope image that the pseudo-boehmite was in the form of fibre. The pseudo-boehmite so prepared was ground into powder, thereafter water, nitric acid as peptizer and starch as extrusion aids were added under conventional extrusion conditions to extrude strips in shape of trifolium having diameter of 1.4 mm. The extrudate was dried at temperature of 110–120° C. and calcined at temperature of 550° C. for 5 hours. The alumina carrier was obtained and marked as A$_1$, its properties are shown in Table 1.

EXAMPLE 2

The present Example illustrates an alumina carrier provided by the present invention and the preparation thereof.

Alumina carrier marked as A$_2$ was prepared by changing the concentration of NaAlO$_2$ solution in Example 1 into 50 g alumina/l, flow rate into 5.3 liter/hr, and the concentration of Al$_2$(SO$_4$)$_3$ to make pH value of precipitation to be 8.0, with otherwise identical conditions. The properties of the alumina carrier A$_2$ are shown in Table 1.

EXAMPLE 3

The present Example illustrates an alumina carrier provided by the present invention and the preparation thereof.

Alumina carrier marked as A$_3$ was prepared by adjusting the flow rate of Al$_2$(SO$_4$)$_3$ solution in Example 1 so as to make the pH value of precipitation to be 6.5, under otherwise identical conditions. The properties of alumina carrier A$_3$ are shown in Table 1.

EXAMPLE 4

The present Example illustrates an alumina carrier provided by the present invention and the preparation thereof.

Alumina carrier marked as A$_4$ was prepared by adjusting the flow rate of Al$_2$(SO$_4$)$_3$ solution in Example 1 so as to make the pH value of precipitation to be 9.0, under otherwise identical conditions. The properties of alumina carrier A$_4$ are shown in Table 1.

EXAMPLE 5

The present Example illustrates an alumina carrier provided by the present invention and the preparation thereof.

Alumina carrier marked as A$_5$ was prepared by changing the temperature of precipitation in Example 1 into 75° C., and adjusting the flow rate of Al$_2$(SO$_4$)$_3$ solution so as to maintain the pH value of precipitation keep at 8.0 under otherwise identical conditions. The properties of alumina carrier A$_5$ are shown in Table 1.

EXAMPLE 6

The present Example illustrates an alumina carrier provided by the present invention and the preparation thereof.

Alumina carrier marked as A$_6$ was prepared by changing the collecting time of the slurry in Example 1 into 80 minutes under otherwise identical conditions. The properties of alumina carrier A$_6$ are shown in Table 1.

TABLE 1

| Example No. | 1 | 2 | 3 | 4 | 5 | 6 |
|---|---|---|---|---|---|---|
| Alumina No. | $A_1$ | $A_2$ | $A_3$ | $A_4$ | $A_5$ | $A_6$ |
| Specific Surface Area, $m^2/g$ | 274 | 265 | 282 | 254 | 301 | 312 |
| Pore Volume, ml/g | 0.62 | 0.56 | 0.73 | 0.55 | 0.59 | 0.65 |
| Pore Distribution, % | | | | | | |
| 20–40 Angstrom | 1.8 | 3.2 | 3.5 | 2.7 | 0.8 | 2.8 |
| 40–100 Angstrom | 89.0 | 85.7 | 86.6 | 86.6 | 87.8 | 88.1 |
| 100–600 Angstrom | 9.2 | 11.1 | 9.8 | 10.6 | 11.4 | 9.1 |

EXAMPLE 7

The present Example illustrates an alumina carrier provided by the present invention and the preparation thereof.

Alumina carrier marked as $A_7$ was prepared by replacing the $Al_2(SO_4)_3$ solution in Example 1 with $Al(NO_3)_3$ solution having same alumina content under otherwise identical conditions. The properties of alumina carrier $A_7$ are shown in Table 2.

EXAMPLE 8

The present Example illustrates an alumina carrier provided by the present invention and the preparation thereof.

Alumina carrier marked as $A_8$ was prepared by replacing the $Al_2(SO_4)_3$ solution in Example 1 with $AlCl_3$ solution having same alumina content under otherwise identical conditions. The properties of alumina carrier $A_8$ are shown in Table 2.

EXAMPLE 9

The present Example illustrates an alumina carrier provided by the present invention and the preparation thereof.

Alumina carrier marked as $A_9$ was prepared by placing the $Al_2(SO_4)_3$ solution in Example 1 with sulfuric acid in concentration of 5 wt % under otherwise identical conditions. The properties of alumina carrier $A_9$ are shown in Table 2.

EXAMPLE 10

The present Example illustrates an alumina carrier provided by the present invention and the preparation thereof.

Alumina carrier marked as $A_{10}$ was prepared by replacing the $Al_2(SO_4)_3$ solution in Example 1 with nitric acid in concentration of 7 wt % under otherwise identical conditions. The properties of alumina carrier $A_{10}$ are shown in Table 2.

EXAMPLE 11

The present Example illustrates an alumina carrier provided by the present invention and the preparation thereof.

Alumina carrier marked as $A_{11}$ was prepared by replacing the sodium carbonate in Example 1 with the mixed solution of ammonium bicarbonate and aqueous ammonia, wherein the concentration of ammonium bicarbonate was 50 gl, the concentration of aqueous ammonium was 5 wt %, and the pH was 9.5 after adjusting under otherwise identical conditions. The properties of alumina carrier $A_{11}$ are shown in Table 2.

EXAMPLE 12

The present Example illustrates an alumina carrier provided by the present invention and the preparation thereof.

Alumina carrier marked as $A_{12}$ was prepared by replacing the sodium carbonate in Example 1 with the ammonium carbonate solution in concentration of 50 g/l and adjusting pH value of the slurry to 9.5 under otherwise identical conditions. The properties of alumina carrier $A_{12}$ are shown in Table 2.

TABLE 2

| Example No. | 7 | 8 | 9 | 10 | 11 | 12 |
|---|---|---|---|---|---|---|
| Alumina No. | $A_7$ | $A_8$ | $A_9$ | $A_{10}$ | $A_{11}$ | $A_{12}$ |
| Specific Surface Area, $m^2/g$ | 274 | 280 | 275 | 268 | 266 | 263 |
| Pore Volume, ml/g | 0.67 | 0.53 | 0.65 | 0.51 | 0.71 | 0.73 |
| Pore Distribution, % | | | | | | |
| 20–40 Angstrom | 0.8 | 4.1 | 1.0 | 5.3 | 2.2 | 2.8 |
| 40–100 Angstrom | 84.4 | 87.5 | 89.2 | 89.8 | 87.4 | 91.5 |
| 100–600 Angstrom | 14.8 | 8.4 | 9.8 | 4.9 | 10.4 | 5.7 |

Comparative Example 1

The preparation of reference alumina carrier.

Figure 2:
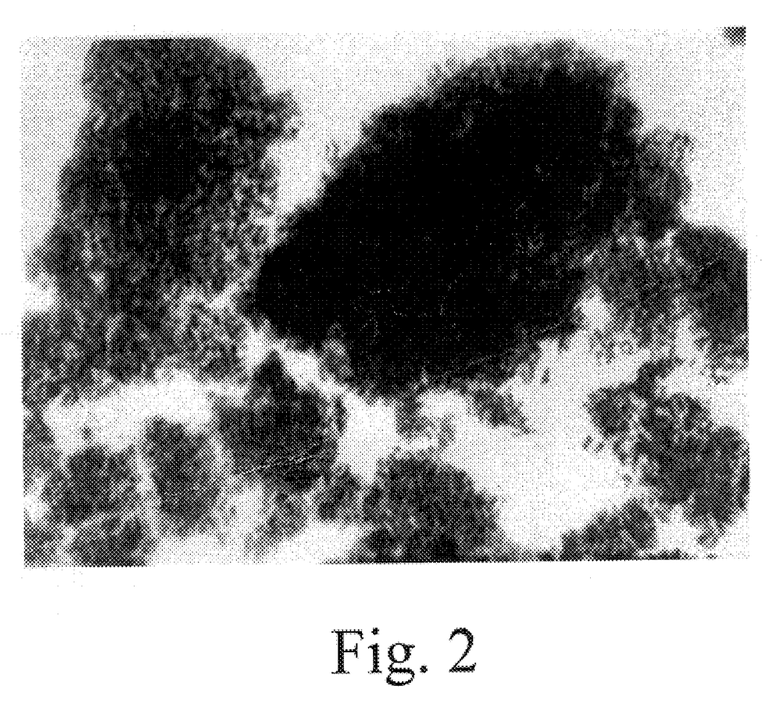
FIG. 2 is a transmission electron microscopic image of the pseudo-boehmite prepared by the prior art.

The alumina carrier was prepared in accordance with the processed disclosed in GB 2,146,633A. An alumina carrier was prepared in accordance with the process of Example 1, with the differences in that it was conducted by adding 0.37 liter of the sodium meta-aluminate solution described in Example 1 into the slurry which had been collected for 20 minutes; filtrating and washing the filter cake sequentially with aqueous ammonia solution, nitric acid solution and aqueous ammonia solution; making the final pH value of the filter cake reach 10; dewatering the filter cake by extruding-desiccating to make the alumina content increase to 30 wt %; kneading the dewatered filter cake; forming strips by extruding method as described in Example 1, drying and calcining. And finally the reference alumina carrier was acquired and marked as $AB_1$. The physical and chemical properties of $AB_1$ are listed in Table 3. FIG. 2 shows a transmission electron microscopic image of pseudo-boehmite obtained from the filter cake after kneading and drying, the image was taken at 50,000 magnifications. It can be seen from the image that the pseudo-boehmite is in the form of particles.

Comparative Example 2

The preparation of reference alumina carrier.

The alumina carrier was prepared in accordance with the process disclosed in U.S. Pat. No. 2,980,632. An alumina carrier was prepared in accordance with the process of Example 1, with the differences in that it was conducted by reducing the flow rate of sodium aluminate after collected slurry for 20 making the pH value of the slurry rise to 10.0. And finally the reference alumina carrier was acquired and marked as $AB_2$. The physical and chemical properties of $AB_2$ are listed in Table 3.

TABLE 3

| Example No. | Comparative Example 1 | Comparative Example 2 |
|---|---|---|
| Alumina No. | $AB_1$ | $AB_2$ |
| Specific Surface Area, m²/g | 217 | 258 |
| Pore Volume, ml/g | 0.48 | 0.45 |
| Pore Distribution, % | | |
| 20–40 Angstrom | 14.7 | 10.2 |
| 40–100 Angstrom | 76.5 | 73.0 |
| 100–600 Angstrom | 8.8 | 16.8 |

EXAMPLE 13

The present Example illustrates an alumina carrier provided by the present invention and the preparation thereof.

Figure 3:
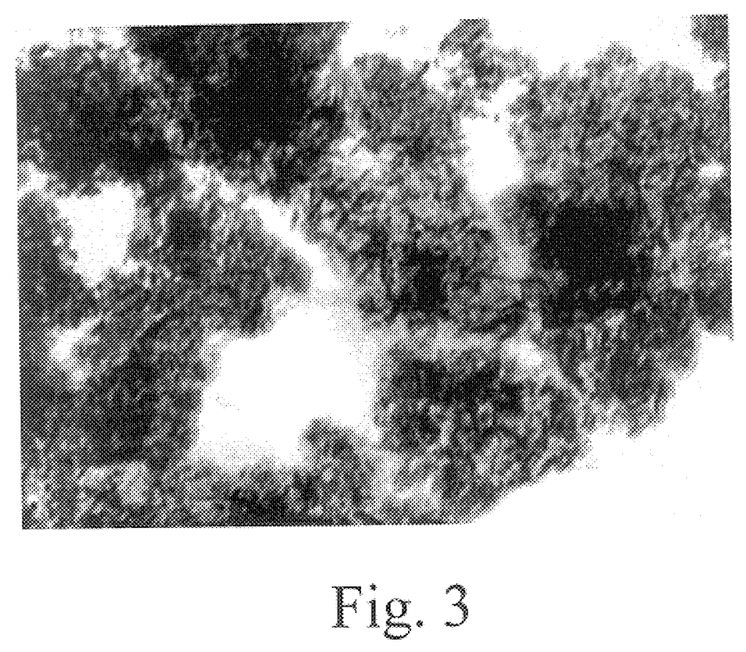
FIG. 3 is a transmission electron microscopic image of the pseudo-boehmite as the precursor of the alumina carrier provided by the present invention.

The pseudo-boehmite was prepared by, adding 20 liters of sodium meta-aluminate solution in concentration of 10 g alumina/l into a precipitation tank with capacity of 25 liters at an initial temperature of 15° C.; introducing a gas mixture consisting of carbon dioxide and air with carbon dioxide content of 30 v % at a flow rate of 22 m³ gas mixture/hr; reacting for 3 minutes and lowering pH value to 6.5 at the then reaction. temperature of 22° C.; rapidly adding the basic substance sodium carbonate solution in concentration of 200 g/l to make pH value of the slurry rise to 9.8 within 4 minutes; raising the temperature to 32° C. and aging for 4 hours at constant temperature; filtrating and washing with 20-fold deionized water at temperature of 90° C. for at least 2 times, and drying at 120° C. to provide pseudo-boehmite. FIG. 3 shows a transmission electron microscopic image of the pseudo-boehmite taken at 50,000 magnification. It can be seen from the transmission electron microscopic image that the pseudo-boehmite is in the shape of fiber. An alumina carrier marked as $A_{13}$ was acquired by the processes of forming, drying and calcining as described in Example 1. The physical and chemical properties of $A_{13}$ are given in Table 4.

EXAMPLE 14

The present Example illustrates an alumina carrier provided by the present invention and the preparation thereof.

An alumina carrier was prepared in accordance with the process of Example 13, with the differences in that it was conducted by replacing the basic substance sodium carbonate solution with basic substance sodium hydroxide; making pH value of the slurry rise to 9.8 within 1 minute. And the alumina carrier was acquired and marked as $A_{14}$. The physical and chemical properties of $A_{14}$ are given in Table 4.

EXAMPLE 15

The present Example illustrates an alumina carrier provided by the present invention and the preparation thereof.

An alumina carrier was prepared in accordance with the process of Example 13, with the differences in that it was conducted by replacing the basic substance sodium carbonate solution with basic substance potassium hydroxide; making pH value of the slurry rise to 9.8 within 3 minutes. And the alumina carrier was acquired and marked as $A_{15}$. The physical and chemical properties of $A_{15}$ are given in Table 4.

EXAMPLE 16

The present Example illustrates an alumina carrier provided by the present invention and the preparation thereof.

An alumina carrier was prepared in accordance with the process of Example 13, with the differences in that it was conducted by replacing the basic substance sodium carbonate solution with aqueous ammonia in concentration 2 wt %; making pH value of the slurry rise to 9.8 within 7 minutes. And the alumina carrier was acquired and marked as $A_{16}$. The physical and chemical properties of $A_{16}$ are given in Table 4.

EXAMPLE 17

The present Example illustrates an alumina carrier provided by the present invention and the preparation thereof.

An alumina carrier was prepared in accordance with the process of Example 13, with the differences in that it was conducted by replacing the basic substance sodium carbonate solution with ammonium carbonate; making pH value of the slurry rise to 9.5 within 9 minutes. And the alumina carrier was acquired and marked as $A_{17}$. The physical and chemical properties of $A_{17}$ are given in Table 4.

TABLE 4

| Example No. | 13 | 14 | 15 | 16 | 17 |
|---|---|---|---|---|---|
| Alumina No. | $A_{13}$ | $A_{14}$ | $A_{15}$ | $A_{16}$ | $A_{17}$ |
| Specific Surface Area, m²/g | 258 | 250 | 244 | 260 | 252 |
| Pore Volume, ml/g | 0.57 | 0.51 | 0.53 | 0.59 | 0.64 |
| Pore Distribution, % | | | | | |
| 20–40 Angstrom | 1.5 | 2.7 | 3.0 | 3.0 | 1.7 |
| 40–100 Angstrom | 91.9 | 89.1 | 90.5 | 93.6 | 90.4 |
| 100–600 Angstrom | 6.6 | 8.2 | 6.5 | 3.4 | 7.9 |

EXAMPLE 18

The present Example illustrates an alumina carrier provided by the present invention and the preparation thereof.

The alumina carrier marked as $A_{18}$ was prepared by adding 4 liters of sodium meta-aluminate solution in concentration of 60 g alumina/l into a precipitation tank with capacity of 6 liters at initial temperature of 60° C.; introducing a gas mixture consisting of carbon dioxide and air with carbon dioxide content of 90 v % at a flow rate of 5.7 m³ gas mixture/hr; reaction for 15 minutes; lowering the pH value to 8.8 at the then reaction temperature of 73° C.; stopping precipitation reaction and rapidly adding sodium carbonate to make the pH of the slurry rise to 11.0 within 9 minutes; raising the temperature to 90° C. and aging for 45 minutes; filtrating and washing with 20-fold deionized water for at least 4 times drying at 110° C.; forming strips by extruding, drying and calcining in accordance with the processes as described in Example 1. The physical and chemical properties of $A_{18}$ are given in Table 5.

EXAMPLE 19

The present Example illustrates an alumina carrier provided by the present invention and the preparation thereof.

An alumina carrier was prepared in accordance with the process of Example 18, with the differences in that it was conducted by using the sodium meta-aluminate solution in concentration of 80 g alumina/l; stopping precipitation reaction after having reacted for 20 minutes and lowering the pH value to 9.3. And the alumina carrier was acquired and marked as $A_{19}$. The physical and chemical properties of $A_{19}$ are given in the Table 5.

EXAMPLE 20

The present Example illustrates an alumina carrier provided by the present invention and the preparation thereof.

An alumina carrier was prepared in accordance with the process of Example 18, with the differences in that it was conducted by using the sodium meta-aluminate solution in concentration of 40 g alumina/l and initial reaction temperature of 30° C.; lowering pH value to 7.8 after having reacted for 12 minutes at the then temperature of 45° C.; adding sodium carbonate in such an amount that made the pH value of the slurry rise to 10.2 within 7 minutes; aging at temperature of 80° C. for 30 minutes. And the alumina carrier was acquired and marked as $A_{20}$. The physical and chemical properties of $A_{20}$ are given in the Table 5.

EXAMPLE 21

The present Example illustrates an alumina carrier provided by the present invention and the preparation thereof.

An alumina carrier was prepared in accordance with the process of Example 18, with the differences in that it was conducted by aging temperature of 33° C., washing with deionized water at temperature of 33° C. And the alumina carrier was acquired and marked as $A_{21}$. The physical and chemical properties of $A_{21}$ are given in the Table 5.

TABLE 5

| Example No. | 18 | 19 | 20 | 21 |
|---|---|---|---|---|
| Alumina No. | $A_{18}$ | $A_{19}$ | $A_{20}$ | $A_{21}$ |
| Specific Surface Area, m²/g | 245 | 270 | 299 | 270 |
| Pore Volume, ml/g | 0.74 | 0.65 | 0.75 | 0.69 |
| Pore Distribution, % | | | | |
| 20–40 Angstrom | 4.0 | 2.6 | 6.1 | 2.9 |
| 40–100 Angstrom | 87.3 | 90.6 | 85.2 | 85.8 |
| 100–600 Angstrom | 8.7 | 6.8 | 8.7 | 11.3 |

EXAMPLE 22

The present Example illustrates an alumina carrier provided by the present invention and the preparation thereof.

150 ml deionized water at initial temperature of 30° C. was added, in advance into a precipitation tank with capacity of 400 ml. A gas mixture consisting of carbon dioxide and air with carbon dioxide content of 35 v % was introduced through the bottom of the tank at flow rate of gas mixture of 0.7 ml/hr, meanwhile, a sodium meta-aluminate solution in concentration of 100 g alumina/l was fed at flow rate of 10 ml/min through the top the tank to make the sodium meta-aluminate solution contact with the gas mixture in counter-current. The process pH value in the course of precipitation reaction was 8.2±0.2 and the reaction temperature maintained at 40±2° C. After 15 minutes, the valve located at the tank bottom was opened to let the formed slurry flow into an aging tank holding 200 ml deionized water added in advance at temperature of 35° C.; the flow rate of the slurry out of the tank was so adjusted to make the liquid level inside the precipitation tank neither go up nor go down. A basic substance sodium carbonate solution in concentration of 50 g/l was added at flow rate of 25 ml/min. The pH value of the slurry in the aging tank was adjusted to keep at 10.0±0.1 and the temperature was maintained at 40±2 C. After collected for 200 minutes, the slurry so formed in precipitation was switched to another aging tank of the same kind, and the basic substance sodium carbonate solution was also switched to the aging tank simultaneously. The slurry in the first aging tank was aged for 4 hours at temperature of 40±2° C., then filtrated and washed with 20-fold deionized water at 90° C. for at least 2 times and dried at 120° C. An alumina carrier marked as $A_{22}$ was acquired by forming strips by extruding, drying, and calcining at 600° C. for 4 hours in accordance with the processes as described in Example 1. The physical and chemical properties of $A_{22}$ are given in the Table 6.

EXAMPLE 23

The present Example illustrates an alumina carrier provided by the present invention and the preparation thereof.

An alumina carrier was prepared in accordance with the process of Example 22, with the differences in controlling the temperature of precipitation at 65±2° C., the temperature in the aging tank at 65±2° C. when collecting the slurry obtained from the precipitation reaction and temperature of aging at 75±2° C. The alumina carrier was acquired and marked as $A_{23}$. The physical and chemical properties of $A_{23}$ are given in the Table 6.

EXAMPLE 24

The present Example illustrates an alumina carrier provided by the present invention and the preparation thereof.

An alumina carrier was prepared in accordance with the process of Example 22, with the differences in that it was conducted by adopting sodium meta-aluminate solution in concentration of 50 g alumina/l, flow rate at 24 ml/min, a gas mixture with carbon dioxide concentration of 75 v % at flow rate of 0.3.3 m³/hr in the precipitation reaction. And the alumina carrier was acquired and marked as $A_{24}$. The physical and chemical properties of $A_{24}$ are given in the Table 6.

EXAMPLE 25

The present Example illustrates an alumina carrier provided by the present invention and the preparation thereof.

An alumina carrier was prepared in accordance with the process of Example 22, with the differences in that it is conducted by adopting the flow rate of gas mixture at 0.83 M³/hr, the process pH value in the course reaction of 7.0±0.2, and flow rate of sodium carbonate solution as basic substance at 30 ml/min. And the alumina carrier was acquired and marked as $A_{25}$. The physical and chemical properties of $A_{25}$ are given in the Table 6.

EXAMPLE 26

The present Example illustrates an alumina carrier provided by the present invention and the preparation thereof.

An alumina carrier was prepared in accordance with the process of Example 13, with the differences in that it was conducted by not adding basic substance after the precipitation was ended, but filtrating rapidly and washing the filter cake with 20-fold deionized water at 90° C. for at least 2 times; mixing the washed filter cake with 10-fold deionized water; aging at 90° C. for 4 hours and filtrating. The other conditions were same as those in Example 13. And the alumina carrier was acquired and marked as $A_{26}$. The physical and chemical properties of $A_{26}$ are given in the Table 6.

TABLE 6

| Example No. | 22 | 23 | 24 | 25 | 26 |
|---|---|---|---|---|---|
| Alumina No. | $A_{22}$ | $A_{23}$ | $A_{24}$ | $A_{25}$ | $A_{26}$ |
| Specific Surface Area, $m^2/g$ | 254 | 267 | 259 | 272 | 258 |
| Pore Volume, ml/g | 0.60 | 0.62 | 0.71 | 0.64 | 0.65 |
| Pore Distribution, % | | | | | |
| 20–40 Angstrom | 3.8 | 0.2 | 2.5 | 2.4 | 3.0 |
| 40–100 Angstrom | 88.2 | 92.7 | 93.8 | 87.5 | 89.0 |
| 100–600 Angstrom | 8.0 | 7.2 | 3.7 | 10.1 | 8.0 |

Comparative Example 3

The preparation of reference alumina carrier.

Figure 4:
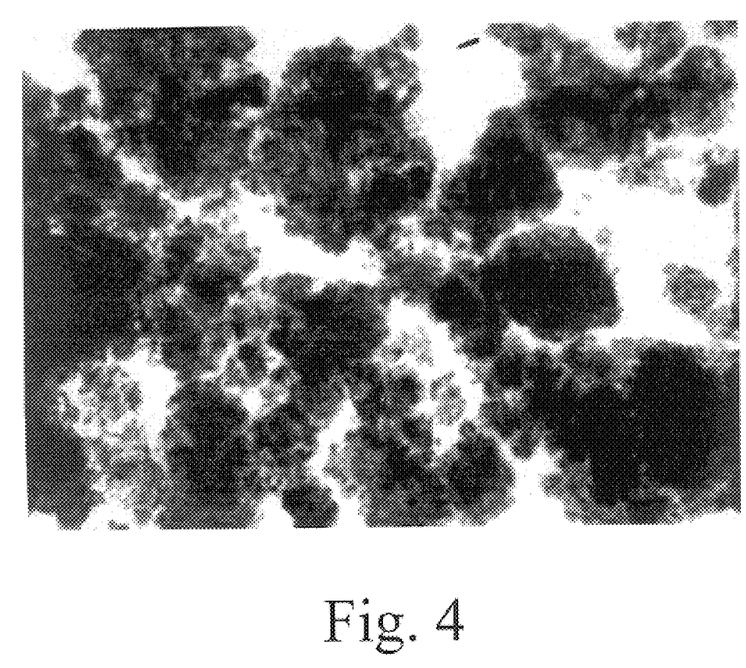
FIG. 4 is a transmission electron microscopic image of the pseudo-boehmite prepared by the prior art.

4 liters of sodium meta-aluminate solution in concentration of 60 g alumina/l was fed into a precipitation tank with capacity of 6 liters. A gas mixture consisting of carbon dioxide content of 35 v % was introduced through the tank bottom at flow rate of gas mixture of 3.3 $m^3$/hr. The initial reaction temperature was 30° C. The pH value was lowered to 10.50 after having reacted for 20 minutes. The reaction temperature at that moment was 41° C. After stopping the precipitation the temperature was raised to 95° C. The pseudo-boehmite was acquired after aging for 4 hours, filtrating and washing with 20-fold deionized water for 4 times and drying at 120° C. FIG. 4 shows a transmission electron microscopic image of the pseudo-boehmite taken at 50,000 magnifications. It can be seen from the micrograph that the pseudo-boehmite was in the shape of solid spheroidal which was packed closely. An reference alumina carrier marked as $AB_3$ was acquired by forming strips by extruding and calcining at 550° C. for 5 hours in accordance with the processes as described in Example 1. The physical and chemical properties of $AB_3$ are given in the Table 7.

Comparative Example 4

The preparation of reference alumina carrier.

A reference alumina carrier marked as $AB_4$ was prepared by lowering the end-point pH value of the precipitation reaction in Comparative Example 3 to 8.5, setting reaction time of 55 minutes under otherwise identical conditions; then drying the resultant, from which dawsonite (NaAl(OH)$_2$CO$_3$) was formed as confirmed by X-ray diffraction analysis; finally forming and calcining in accordance with processes as described in Example 1. The physical and chemical properties of $AB_4$ are listed in Table 7.

Comparative Example 5

The preparation of reference alumina carrier.

A reference alumina carrier marked as $AB_5$ was prepared by not adding basic substance sodium meta-aluminate to adjust the pH value of the slurry under otherwise identical conditions as in Example 22; drying the resultant, from which dawsonite (NaAl(OH)$_2$CO$_3$) was formed as confirmed by X-ray diffraction analysis; finally forming and calcining in accordance with processes as described in Example 1. The physical and chemical properties of $AB_5$ are listed in Table 7.

Comparative Example 6

The preparation of reference alumina carrier.

An alumina carrier was prepared in accordance with process of Example 22 with the differences in that it was conducted by keeping the flow rate of the gas mixture of 0.45 $m^3$/hr; controlling the process pH value in the course of reaction at 10.5±0.1; not adding basic substance sodium carbonate solution. The reference alumina carrier was acquired and marked as $AB_6$. The physical and chemical properties of $AB_6$ are listed in Table 7.

TABLE 7

| Comparative Example No. | 3 | 4 | 5 | 6 |
|---|---|---|---|---|
| Alumina No. | $AB_3$ | $AB_4$ | $AB_5$ | $AB_6$ |
| Specific Surface Area, $m^2/g$ | 256 | 28 | 41 | 270 |
| Pore Volume, ml/g | 0.38 | 0.07 | 0.11 | 0.37 |
| Pore Distribution, % | | | | |
| 20–40 Angstrom | 92.0 | — | — | 88.6 |
| 60–100 Angstrom | 6.8 | — | — | 5.5 |
| 100–600 Angstrom | 1.2 | — | — | 5.9 |

EXAMPLES 27 TO 52

The following examples illustrate the catalyst for hydrorefining fraction oils provided by the present invention and the preparation thereof.

200 grams of alumina samples from $A_1$ to $A_{10}$ prepared in Examples 1–10 and from $Al_{13}$ to $A_{26}$ prepared in Examples 13–26 were taken, respectively; the samples were impregnated with 200 milliliters of ammonium fluoride solution in concentration of 4.53 wt % for 1 hour. 200 grams of alumina sample $A_{11}$ prepared in Example 11 was taken and impregnated with 200 milliliters of ammonium fluoride solution in concentration of 3.47 wt % for 1 hour. 200 grams of alumina sample $A_{12}$ prepared in Example 12 was taken and impregnated with 200 milliliters of ammonium fluoride solution in concentration of 10.6 wt % for 1 hour. Thereafter, all the alumina samples after impregnated with fluorine were dried at 120° C. and calcined at 500° C. for 4 hours. The alumina sample $A_7$ after impregnated with fluorine and calcined was taken and impregnated with 180 milliliters of mixed solution consisting of ammonium metawolframate and nickel nitrate containing tungsten oxide 35 g/ml and nickel oxide 2.78 g/ml for 2 hours. The alumina sample $A_8$ after impregnated with fluorine and calcined was taken and impregnated with 180 milliliters of mixed solution consisting of ammonium metawolframate and nickel nitrate containing tungsten oxide 35 g/ml and nickel oxide 5.55 g/ml for 2 hours. The alumina sample $A_9$ after impregnated with fluorine and calcined was taken and impregnated with 180 milliliters of mixed solution consisting of ammonium metawolframate and nickel nitrate containing tungsten oxide 22.2 g/ml and nickel oxide 3.61 g/ml for 2 hours. The alumina sample $A_{10}$ after impregnated with fluorine and calcined was taken and impregnated with 180 milliliters of mixed solution consisting of ammonium metawolframate and nickel nitrate containing tungsten oxide 43.0 g/ml and nickel oxide 3.61 g/ml for 2 hours. The other alumina samples impregnated with fluorine and calcined were impregnated with 180 milliliters of mixed solution consisting of ammonium metawolframate and nickel nitrate containing tungsten oxide 31.6 g/ml and nickel oxide 3.20 g/ml for 2 hours, respectively. Then, all the samples after impregnated with tungsten and -nickel were dried at 120° C. and thereafter calcined at 500° C. for 4 hours. The catalysts marked as from $C_1$ to $C_{26}$ were acquired. The contents of -tungsten oxide, nickel oxide and fluorine in the catalysts were listed in Tables 8–11. The method for measuring contents of tungsten oxide and nickel oxide can be found in "The Petrochemical Analytical Methods" (RIPP Testing Method), pages 360–361, 1990, published by the Scientific Publishing House. The method for measuring content of fluorine can be found also in the same book on pages 185–187.

Comparative Examples 7 and 8

The following examples illustrate the preparation of the reference catalysts.

Catalysts were prepared in accordance with the process as described in Example 27 with the difference in that alumina carriers $AB_1$ and $AB_2$ prepared in Comparative Example 1 and Comparative Example 2 are used respectively in these two comparative examples. The-reference catalysts marked as $B_1$ and $B_2$ were acquired. The contents of tungsten oxide., nickel oxide and fluorine in $B_1$ and $B_2$ are listed in the Table 12.

Comparative Examples 9 and 10

The following examples illustrate the preparation of the reference catalyst.

Catalysts were prepared in accordance with process as described in Example 27 with the difference in that alumina carrier $AB_3$ and $AB_6$ prepared in comparative Example 3 and Comparative Example 6 are used, respectively in these two comparative examples. The reference catalysts marked as $B_3$ and $B_4$ were acquired. The contents of tungsten oxide, nickel oxide and fluorine in $B_3$ and $B_4$ are listed in the Table 12.

Comparative Example 11

The following example illustrates the preparation of the reference catalyst.

A catalyst was prepared in accordance with the process described in Example 27 with the difference in that the alumina carrier used was the same, as that used in example 2 in CN 85104438B. The reference catalyst marked as $B_2$ was acquired. The contents of tungsten oxide, -nickel oxide and fluorine in $B_5$ are listed in the Table 12.

TABLE 8

| Example No. | 27 | 28 | 29 | 30 | 31 | 32 |
|---|---|---|---|---|---|---|
| Carrier No. | $A_1$ | $A_2$ | $A_3$ | $A_4$ | $A_5$ | $A_6$ |
| Catalyst | $C_1$ | $C_2$ | $C_3$ | $C_4$ | $C_5$ | $C_6$ |
| Tungsten Oxide Content wt % | | | 21.3 | | | |
| Nickel Oxide Content wt % | | | 2.3 | | | |
| Fluorine Content wt % | | | 3.0 | | | |
| Specific Surface Area m²/g | 164 | 159 | 169 | 152 | 177 | 1.83 |
| Pore Volume, ml/g | 0.50 | 0.45 | 0.58 | 0.44 | 0.48 | 0.52 |
| Bulk Density, g/ml | 0.82 | 0.84 | 0.79 | 0.84 | 0.83 | 0.81 |

TABLE 9

| Example No. | 33 | 34 | 35 | 36 | 37 | 38 |
|---|---|---|---|---|---|---|
| Carrier No. | $A_7$ | $A_8$ | $A_9$ | $A_{10}$ | $A_{11}$ | $A_{12}$ |
| Catalyst | $C_7$ | $C_8$ | $C_9$ | $C_{10}$ | $C_{11}$ | $C_{12}$ |
| Tungsten Oxide Content wt % | 23.6 | 23.6 | 15.0 | 30.0 | 23.6 | 23.6 |
| Nickel Oxide Content wt % | 2.0 | 4.0 | 2.6 | 2.6 | 2.6 | 2.6 |
| Fluorine Content wt % | 4.5 | 168 | 165 | 160 | 159 | 7.0 |
| Specific Surface Area m²/g | 164 | 0.42 | 0.52 | 0.41 | 0.57 | 158 |
| Pore Volume, ml/g | 0.54 | 0.85 | 0.81 | 0.85 | 0.79 | 0.58 |
| Bulk Density, g/ml | 0.80 | 0.85 | 0.81 | 0.85 | 0.79 | 0.79 |

TABLE 10

| Example No. | 39 | 40 | 41 | 42 | 43 | 44 | 45 |
|---|---|---|---|---|---|---|---|
| Carrier No. | $A_{13}$ | $A_{14}$ | $A_{15}$ | $A_{16}$ | $A_{17}$ | $A_{18}$ | $A_{19}$ |
| Catalyst | $C_{13}$ | $C_{14}$ | $C_{15}$ | $C_{16}$ | $C_{17}$ | $C_{18}$ | $C_{19}$ |
| Tungsten Oxide Content wt % | | | | 21.3 | | | |
| Nickel Oxide Content wt % | | | | 2.3 | | | |
| Fluorine Content wt % | | | | 3.0 | | | |
| Specific Surface Area m²/g | 162 | 165 | 169 | 165 | 160 | 163 | 170 |
| Pore Volume, ml/g | 0.46 | 0.40 | 0.42 | 0.47 | 0.51 | 0.59 | 0.52 |
| Bulk Density, g/ml | 0.84 | 0.86 | 0.85 | 0.84 | 0.82 | 0.78 | 0.82 |

TABLE 11

| Example No. | 46 | 47 | 48 | 49 | 50 | 51 | 52 |
|---|---|---|---|---|---|---|---|
| Carrier No. | $A_{20}$ | $A_{21}$ | $A_{22}$ | $A_{23}$ | $A_{24}$ | $A_{25}$ | $A_{26}$ |
| Catalyst | $C_{20}$ | $C_{21}$ | $C_{22}$ | $C_{23}$ | $C_{24}$ | $C_{25}$ | $C_{26}$ |
| Tungsten Oxide Content wt % | | | | 21.3 | | | |
| Nickel Oxide Content wt % | | | | 2.3 | | | |
| Fluorine Content wt % | | | | 3.0 | | | |
| Specific Surface Area m²/g | 185 | 173 | 158 | 171 | 159 | 165 | 157 |
| Pore Volume, ml/g | 0.60 | 0.55 | 0.48 | 0.50 | 0.57 | 0.51 | 0.52 |
| Bulk Density, g/ml | 0.78 | 0.80 | 0.84 | 0.82 | 0.80 | 0.81 | 0.81 |

TABLE 12

| Comparative Example No. | 7 | 8 | 9 | 10 | 11 |
|---|---|---|---|---|---|
| Carrier No. | $AB_1$ | $AB_2$ | $AB_3$ | $AB_6$ | Carrier used in CN85104438B |
| Catalyst | $B_1$ | $B_2$ | $B_3$ | $B_4$ | $B_5$ |
| Tungsten Oxide Content wt % | | | 21.3 | | |
| Nickel Oxide Content wt % | | | 2.3 | | |
| Fluorine Content wt % | | | 3.0 | | |
| Specific Surface Area m²/g | 139 | 145 | 137 | 129 | 135 |
| Pore Volume, ml/g | 0.38 | 0.36 | 0.27 | 0.26 | 0.29 |
| Bulk Density, g/ml | 0.89 | 0.91 | 1.03 | 1.05 | 1.03 |

EXAMPLES FROM 53 TO 78

The following examples illustrate the hydrodesulphurization activity of the catalysts provided by the present invention.

The catalyst strips $C_1$–$C_{26}$ so prepared were cut into segments having a length in the range of 2–3 millimeter, and then loaded a fixed bed hydrogenation reactor with capacity of 100 milliliters to evaluate the hydrodesulphurization activity with the oil feed stock 1 as shown in Table 13. The evaluations were carried out under the conditions of catalyst loading amount 100 milliliters (78–86 grams), reaction temperature 300 or 340° C., reaction pressure at 3.2 Mpa, hourly liquid hourly space velocity LHSV 3.0 hr$^{-1}$ and volume ratio of hydrogen/oil 300. The evaluation results at different reaction temperatures are listed in Tables 14–16.

Comparative Examples from 12 to 16

The following comparative examples illustrate the hydrodesulphurization activity of the reference catalysts.

The hydrodesulphurization activity of the catalysts were evaluated in accordance with the method as described in Examples 53–78, with, the difference in that the catalysts used are the reference catalysts $B_1$–$B_5$. The evaluation results are listed in Table 17.

TABLE 13

| No. of Oil Feed Stock | Oil Feed Stock 1 | Oil Feed Stock 2 |
|---|---|---|
| Name of Oil Feed Stock | Kerosene from Line II of atmospheric distillation unit | Catalytic cracking diesel |
| Density, g/ml | 0.8399 | 0.9031 |
| Sulfur Content, ppm | 11000 | 2536 |
| Nitrogen Content, ppm | 58.4 | 1901 |
| Basic Nitrogen Content, ppm | 22 | 402 |
| Colloid Content, mg/100 ml | 22 | 44.4 |
| Aniline Point, ° C. | 58.4 | 38.9 |

TABLE 14

| | | Desulfurization percent, wt % | |
|---|---|---|---|
| Example No. | Catalyst No. | 300° C. | 340° C. |
| 53 | $C_1$ | 47.9 | 84.9 |
| 54 | $C_2$ | 46.8 | 84.8 |
| 55 | $C_3$ | 45.3 | 84.9 |
| 56 | $C_4$ | 49.3 | 86.7 |
| 57 | $C_5$ | 44.8 | 82.8 |
| 58 | $C_6$ | 45.9 | 83.4 |
| 59 | $C_7$ | 47.4 | 84.5 |
| 60 | $C_8$ | 49.8 | 85.1 |

TABLE 15

| | | Desulfurization percent, wt % | |
|---|---|---|---|
| Example No. | Catalyst No. | 300° C. | 340° C. |
| 61 | $C_9$ | 45.1 | 85.5 |
| 62 | $C_{10}$ | 49.2 | 86.1 |
| 63 | $C_{11}$ | 48.3 | 86.0 |
| 64 | $C_{12}$ | 45.4 | 82.9 |
| 65 | $C_{13}$ | 44.6 | 83.1 |
| 66 | $C_{14}$ | 46.3 | 85.2 |
| 67 | $C_{15}$ | 45.8 | 84.9 |
| 68 | $C_{16}$ | 47.6 | 85.6 |
| 69 | $C_{17}$ | 45.1 | 82.9 |

TABLE 16

| | | Desulfurization percent, wt % | |
|---|---|---|---|
| Example No. | Catalyst No. | 300° C. | 340° C. |
| 70 | $C_{18}$ | 48.2 | 86.0 |
| 71 | $C_{19}$ | 49.5 | 86.3 |
| 72 | $C_{20}$ | 47.3 | 85.2 |
| 73 | $C_{21}$ | 45.6 | 83.0 |
| 74 | $C_{22}$ | 44.9 | 83.2 |
| 75 | $C_{23}$ | 48.2 | 86.3 |

TABLE 16-continued

| Example No. | Catalyst No. | Desulfurization percent, wt % | |
| --- | --- | --- | --- |
| | | 300° C. | 340° C. |
| 76 | $C_{24}$ | 49.7 | 86.8 |
| 77 | $C_{25}$ | 46.8 | 84.0 |
| 78 | $C_{26}$ | 47.4 | 83.8 |

TABLE 17

| Comparative Example No. | Catalyst No. | Desulfurization percent, wt % | |
| --- | --- | --- | --- |
| | | 300° C. | 340° C. |
| 12 | $B_1$ | 41.8 | 80.3 |
| 13 | $B_2$ | 41.5 | 80.0 |
| 14 | $B_3$ | 40.0 | 79.1 |
| 15 | $B_4$ | 34.7 | 70.5 |
| 16 | $B_5$ | 43.7 | 81.5 |

EXAMPLES FROM 79 TO 104

The following examples illustrate the hydrodesulphurization activity and hydrodenitrification activity of the catalysts provided by the present invention.

The catalyst strips of $C_1$–$C_{26}$ so prepared were cut into segments having a length in the rang of 2–3 millimeters, and then loaded into a fixed bed hydrogenation reactor with capacity of 100 milliliters to evaluate the hydrodesulphurization activity and hydrodenitrification activity with the oil feed stock 2 as shown in Table 13. The evaluations were carried out under the conditions of catalyst loading amount of 100 milliliters, reaction temperature 320 and 350° C, hourly liquid hourly space velocity (LHSV) 2.0 $hr^{-1}$ and volume ratio of hydrogen/oil 350. The evaluation results at different reaction temperatures are listed in Tables 18–20.

Comparative Examples from 17 to 21

The following comparative examples illustrate the hydrodesulphurization activity of the reference catalysts.

The hydrodesulphurization activity of the catalysts were evaluated in accordance with the method as described in Examples 79–104, with the difference in that the reference catalysts $B_1$–$B_5$ were used in these comparative examples. The evaluation results at different reaction temperatures are listed in Table 21.

TABLE 18

| Example No. | Catalyst No. | Desulfurization percent, wt % | | Denitrification percent, wt % | |
| --- | --- | --- | --- | --- | --- |
| | | 320° C. | 350° C. | 320° C. | 350° C. |
| 79 | $C_1$ | 78.3 | 88.0 | 35.8 | 44.9 |
| 80 | $C_2$ | 77.0 | 87.1 | 34.2 | 43.8 |
| 81 | $C_3$ | 76.2 | 86.9 | 34.7 | 44.6 |
| 82 | $C_4$ | 79.0 | 87.4 | 35.6 | 44.9 |
| 83 | $C_5$ | 76.0 | 86.4 | 36.3 | 45.1 |
| 84 | $C_6$ | 76.3 | 86.7 | 36.8 | 45.4 |
| 85 | $C_7$ | 78.5 | 87.8 | 34.4 | 43.2 |
| 86 | $C_8$ | 79.0 | 87.4 | 33.8 | 43.4 |

TABLE 19

| Example No. | Catalyst No. | Desulfurization percent, wt % | | Denitrification percent, wt % | |
| --- | --- | --- | --- | --- | --- |
| | | 320° C. | 350° C. | 320° C. | 350° C. |
| 87 | $C_9$ | 76.5 | 86.3 | 35.3 | 44.2 |
| 88 | $C_{10}$ | 79.3 | 87.8 | 36.0 | 44.6 |
| 89 | $C_{11}$ | 77.8 | 87.3 | 36.4 | 44.7 |
| 90 | $C_{12}$ | 76.4 | 86.2 | 35.0 | 43.9 |
| 91 | $C_{13}$ | 76.5 | 85.9 | 33.5 | 43.6 |
| 92 | $C_{14}$ | 77.5 | 86.4 | 35.2 | 44.0 |
| 93 | $C_{15}$ | 77.0 | 86.1 | 36.7 | 45.6 |
| 94 | $C_{16}$ | 78.3 | 87.2 | 34.7 | 44.0 |
| 95 | $C_{17}$ | 76.2 | 86.5 | 35.3 | 44.3 |

TABLE 20

| Example No. | Catalyst No. | Desulfurization percent, wt % | | Denitrification percent, wt % | |
| --- | --- | --- | --- | --- | --- |
| | | 320° C. | 350° C. | 320° C. | 350° C. |
| 96 | $C_{18}$ | 78.9 | 88.3 | 34.6 | 43.8 |
| 97 | $C_{19}$ | 79.2 | 87.9 | 36.1 | 44.6 |
| 98 | $C_{20}$ | 77.5 | 86.9 | 36.5 | 44.9 |
| 99 | $C_{21}$ | 76.8 | 86.4 | 34.9 | 44.0 |
| 100 | $C_{22}$ | 76.2 | 86.5 | 35.6 | 44.3 |
| 101 | $C_{23}$ | 77.3 | 87.2 | 35.5 | 44.6 |
| 102 | $C_{24}$ | 77.9 | 87.7 | 35.4 | 44.4 |
| 103 | $C_{25}$ | 76.8 | 86.8 | 36.8 | 45.0 |
| 104 | $C_{26}$ | 77.8 | 87.4 | 33.6 | 43.7 |

TABLE 21

| Comparative Example No. | Catalyst No. | Desulfurization percent, wt % | | Denitrification percent, wt % | |
| --- | --- | --- | --- | --- | --- |
| | | 320° C. | 350° C. | 320° C. | 350° C. |
| 17 | $B_1$ | 72.8 | 82.1 | — | — |
| 18 | $B_2$ | 71.9 | 81.5 | — | — |
| 19 | $B_3$ | 70.8 | 80.1 | — | 40.8 |
| 20 | $B_4$ | 60.5 | 71.8 | — | 34.7 |
| 21 | $B_5$ | 75.3 | 84.0 | — | 42.7 |

EXAMPLES FROM 105 TO 140

The following examples illustrate the toluene saturation-hydrogenation activity of the catalysts provided by the present invention.

The toluene saturation-hydrogenation activities of the catalysts $C_1$–$C_{26}$ were evaluated in a small scale fixed bed reactor with n-hexane solution containing 50 wt % toluene as feedstock. The evaluation was conducted by loading 1.0 gram catalyst which was precured with cyclic hexane solution containing 3 wt % carbon disulfide at 300° C. for 2 hours under hydrogen atmosphere; thereafter introducing the reactant feedstock at temperature of 360° C., pressure of 4.1 Mpa, weight hourly space velocity of 3.4 hr$^{-1}$ and volume ratio of hydrogen/oil of 400. The specimens were taken after being reacted for 3 hours; and the resultant products were analyzed by an on-line gas chromatograph. The reaction results are listed in Tables 22–24.

Comparative Examples from 22 to 26

The following comparative examples illustrate the toluene saturation-hydrogenation activity of the reference catalysts.

The activities of the catalysts were evaluated under the conditions described in Examples 105–140 with the difference in that reference catalysts $B_1$–$B_5$ were used. The evaluation results are listed in Table 25.

TABLE 22

| Example No. | Catalyst No. | Toluene Conversion, wt % |
| --- | --- | --- |
| 105 | $C_1$ | 36.3 |
| 106 | $C_2$ | 34.4 |
| 107 | $C_3$ | 35.0 |
| 108 | $C_4$ | 36.2 |
| 109 | $C_5$ | 36.5 |
| 120 | $C_6$ | 36.4 |
| 121 | $C_7$ | 33.8 |
| 122 | $C_8$ | 35.2 |

TABLE 23

| Example No. | Catalyst No. | Conversion of Toluene, wt % |
| --- | --- | --- |
| 123 | $C_9$ | 35.0 |
| 124 | $C_{10}$ | 35.5 |
| 125 | $C_{11}$ | 35.9 |
| 126 | $C_{12}$ | 34.7 |
| 127 | $C_{13}$ | 33.8 |
| 128 | $C_{14}$ | 34.5 |
| 129 | $C_{15}$ | 35.4 |
| 130 | $C_{16}$ | 34.3 |
| 131 | $C_{17}$ | 33.8 |

TABLE 24

| Example No. | Catalyst No. | Conversion of Toluene, wt % |
| --- | --- | --- |
| 132 | $C_{18}$ | 34.1 |
| 133 | $C_{19}$ | 35.3 |
| 134 | $C_{20}$ | 34.0 |
| 135 | $C_{21}$ | 35.3 |
| 136 | $C_{22}$ | 34.8 |
| 137 | $C_{23}$ | 35.9 |
| 138 | $C_{24}$ | 35.4 |
| 139 | $C_{25}$ | 36.3 |
| 140 | $C_{26}$ | 33.6 |

TABLE 25

| Comparative Example No. | Catalyst No. | Conversion of Toluene, wt % |
| --- | --- | --- |
| 22 | $B_1$ | 29.8 |
| 23 | $B_2$ | 28.9 |
| 24 | $B_3$ | 28.3 |
| 25 | $B_4$ | 26.3 |
| 26 | $B_5$ | 31.1 |

What is claimed is:

1. A catalyst for hydrofining fraction oils, comprising an alumina carrier and at least one metal and/or thereof oxide of Group VIB and at least one metal and/or thereof oxide of Group VIII supported on the alumina carrier wherein the pore volume of said alumina carrier is not less than 0.35 ml/g, in which the pore volume of the pores having a diameter of 40–100 angstrom accounts for more than 80% of the total pore volume, and wherein said alumna carrier is prepared by one of the following processes, wherein:

Process 1 comprises steps as follow:
1) contacting a solution of sodium meta-aluminate or sodium aluminate with one or more of the solutions of aluminium sulfate, aluminium nitrate, aluminium chloride, nitric acid and sulfuric acid to carry out the primary precipitation reaction under a pH value range of from 6 to 9.5 and a temperature range of from 10 to 100° C.;
2) reacting the resultant of step 1) with one or more of alkali carbonate, a mixed solution of alkali bicarbonate and aqueous ammonia ammonium carbonate and ammonium bicarbonate to carry out the secondary precipitation reaction under a pH value range of from 9.0 to 10.5; and
3) aging the aluminium hydrate obtained from the step 2), separating solid from liquid, and washing, drying and calcining the obtained solid resultant, and Process 2 comprises steps as follow:
1) contacting a solution of sodium meta-aluminate or sodium aluminate with a gas containing carbon dioxide to carry out precipitation, wherein the pH value in the course of said precipitation is controlled in the range of 6–9.5, the time of said precipitation reaction is less than 40 minutes, the temperature of said precipitation reaction is 10–100° C.;
2) as soon as said precipitation reaction is ended a basic substance is added promptly so as to make the pH value of the slurry rise to higher than 9.5 or quickly carry out the separation of the solid from liquid and washing; and
3) aging the aluminium hydrate obtained from step 2); separating solid from liquid and washing, drying, and calcining the obtained solid resultant.

2. The catalyst according to claim 1, characterized in that, in process 1, the concentration of said sodium meta-aluminate or sodium aluminate solution is 30–300 g alumina/l; the concentration of aluminum sulfate, aluminium nitrate and aluminium chloride is 10–120 g alumina/l; and the concentration of nitric acid and sulfuric acid solution is 5–15 wt %.

3. The catalyst according to claim 1, characterized in that, in process 1, the primary precipitation reaction is carried out at a pH value of 6–9 and a temperature of 30–90° C.; and the pH value of secondary precipitation is 9.5–10.5.

4. The catalyst according to claim 1, characterized in that, when the alumina carrier is prepared according to process 1 or process 2, there is a step of shaping before drying.

5. The catalyst according to claim 1, characterized in that, the concentration of said sodium meta-aluminate or sodium aluminate solution used in process 2 is 5–200 g alumina/l.

6. The catalyst according to claim 5, characterized in that, the concentration of said sodium meta-aluminate or sodium aluminate solution is 5–120 g alumina/l.

7. The catalyst according to claim 1, characterized in that, the gas containing carbon dioxide used in process 2 is pure carbon dioxide gas, or a mixed gas of carbon dioxide and inert gas which does not affect the reaction.

8. The catalyst according to claim 1, characterized in that, the carbon dioxide content in said gas containing carbon dioxide used in process 2 is not less than 5 v %.

9. The catalyst according to claim 8, characterized in that, the carbon dioxide content in said gas containing carbon dioxide is not less than 20 v %.

10. The catalyst according to claim 1, characterized in that, in process 2, after a basic substance is added, the pH value of the slurry is increased rapidly to 9.5–11.5.

11. The catalyst according to claim 1, characterized in that, said basic substance used in process 2 is one or more matters selected from the group consisting of inorganic bases, organic bases and their aqueous solutions.

12. The catalyst according to claim 11, characterized in that, said inorganic base is one or more matters selected from the group consisting of hydroxides, meta-aluminates, carbonates and bicarbonates of alkali metals, ammonium carbonates, aqueous ammonia and their aqueous solutions; and said organic base is one or more matters selected from the group consisting of water-soluble amines, carbamides, pyridine and their aqueous solutions.

13. The catalyst according to claim 12, characterized in that, said organic base is one or more matters selected from the group consisting of water-soluble aliphatic amines, hydrocarbyl-ammonium hydroxide, urea, pyridine and their aqueous solutions.

14. The catalyst according to claim 13, characterized in that, said organic base is one or more matters selected from the group consisting of methylamine, ethylamine, propylamine, propane diamine, isomers of, butyl amine, isomers of pentyl amine, tetraethylammonium hydroxide, urea, pyridine and their aqueous solutions.

15. The catalyst according to claim 1, characterized in that, said metal and/or thereof oxide of Group VIB is one or more matters selected from the group consisting of chromium, molybdenum, tungsten and their oxides; and said metal and/or thereof oxide of Group VIII is one or more matters selected from the group consisting of cobalt, nickel and their oxides.

16. The catalyst according to claim 15, characterized in that, said metal and/or thereof oxide of Group VIB is tungsten metal and/or its oxide, said metal and/or thereof oxide of Group VIII is nickel and/or its oxide; said metal of Group VIB is present in an amount of 12–35 wt % and said metal of Group VIII is present in an amount of 1–5 wt %, calculated as oxide and based on the total amount of the catalyst.

17. The catalyst according to claim 1, characterized in that, the catalyst also contains fluorine in an amount of 1–9 wt % based on the total amount of the catalyst.

18. A process for preparing the catalyst according to claim 1, comprising impregnating the catalyst carrier with an aqueous solution containing the metals of Group VIB and Group VIII, drying and calcining after impregnation, wherein said catalyst carrier is an alumina carrier prepared by the process 1 and/or process 2 described in claim 1.

19. The process according to claim 18, characterized in that, the catalyst carrier is impregnated with an aqueous solution containing fluorine, dried and calcined before the catalyst carrier is impregnated with the aqueous solution containing the metals of Groups VIB and VIII.

20. The process according to claim 18 or 19, characterized in that, after impregnating the catalyst carrier with the aqueous solution containing the metals of Groups VIB and VIII or after impregnating the catalyst carrier with the aqueous solution containing fluorine, the calcination temperatures respectively is 400–600° C.; and the calcining time is 1–8 hours.

21. A process for making an alumina carrier suitable for a catalyst for hydrofining fraction oils wherein the pore volume of the alumina carrier is not less than 0.35 ml/g, in which the pore volume of the pores having a diameter of 40–100 angstrom accounts for more than 80% of the total pore volume, and wherein the alumina carrier is prepared by one of the following processes, wherein Process 1 comprises steps as follow:
1) contacting a solution of sodium meta-aluminate or sodium aluminate with one or more of the solutions of aluminium sulfate, aluminium nitrate, aluminium chloride, nitric acid and sulfuric acid to carry out the primary precipitation reaction under a pH value range of from 6 to 9.5 and a temperature range of from 10 to 100° C.;
2) reacting the resultant of step 1) with one or more of alkali carbonate, a mixed solution of alkali bicarbonate and aqueous ammonia, ammonium carbonate and ammonium bicarbonate to carry out the secondary precipitation reaction under a pH value range of from 9.0 to 10.5; and
3) aging the aluminium hydrate obtained from the step 2), separating solid from liquid, and washing, drying and calcining the obtained solid resultant,
and Process 2 comprises steps as follow:
1) contacting a solution of sodium meta-aluminate or sodium aluminate with a gas containing carbon dioxide to carry out precipitation, wherein the pH value in the course of said precipitation is controlled in the range of 6–9.5, the time of said precipitation reaction is less than 40 minutes, the temperature of said precipitation reaction is 10–100° C.,
2) as soon as said precipitation reaction is ended a basic substance is added promptly so as to make the pH value of the slur rise to higher than 9.5 or quickly carry out the separation of the solid from liquid and washing; and
3) aging the aluminium hydrate obtained from step 2); separating solid from liquid and washing, drying and calcining the obtained solid resultant.

22. An alumina carrier made by the process of claim 21.

23. A catalyst for hydrofining fractions oils, comprising a calcined carrier and at least one metal and/or thereof oxide of Group VIB and at least one metal and/or thereof oxide of Group VIII supported on the alumina carrier, characterized in that, the pore volume of said alumina carrier not less than 0.35 ml/g, and in which the pore volume of the pores having a diameter of 40–100 angstrom accounts for more than 80% of the total pore volume.

24. The catalyst according to claim 23, characterized in that, said metal and/or thereof oxide of Group VIB is one or more matters selected from the group consisting of chromium, molybdenum, tungsten and their oxides; and said metal and/or thereof oxide of Group VIII is one or more matters selected from the group consisting of cobalt, nickel and their oxides.

25. The catalyst according to claim 23, characterized in that, said metal and/or thereof oxide of Group VIB is tungsten metal and/or its oxide, said metal and/or thereof oxide of Group VII is nickel and/or its oxide; said metal of Group VIB is present in an amount of 12–35 wt % and said metal of Group VII is present in an amount of 1–5 wt %, calculated as oxide and based on the total amount of the catalyst.

26. The catalyst according to claim 23, characterized in that, the catalyst also contains fluorine in an amount of 1–9 wt % based on the total amount of the catalyst.

* * * * *